United States Patent
Kim et al.

(10) Patent No.: US 12,252,630 B2
(45) Date of Patent: *Mar. 18, 2025

(54) CONDUCTIVE STRUCTURE AND ANTISTATIC COMPOSITION INCLUDING THE SAME

(71) Applicant: DAEJIN ADVANCED MATERIALS INC., Gyeonggi-do (KR)

(72) Inventors: Gwan Yeong Kim, Gyeonggi-do (KR); Gi Moon Yoo, Gyeonggi-do (KR)

(73) Assignee: DAEJIN ADVANCED MATERIALS INC., Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/761,267

(22) PCT Filed: Nov. 12, 2021

(86) PCT No.: PCT/KR2021/016512
§ 371 (c)(1),
(2) Date: Mar. 17, 2022

(87) PCT Pub. No.: WO2022/250222
PCT Pub. Date: Dec. 1, 2022

(65) Prior Publication Data
US 2024/0067836 A1    Feb. 29, 2024

(30) Foreign Application Priority Data

May 24, 2021  (KR) ........................ 10-2021-0066193
Nov. 3, 2021  (KR) ........................ 10-2021-0150089

(51) Int. Cl.
*C09D 5/24*     (2006.01)
*C01B 32/174*   (2017.01)
(Continued)

(52) U.S. Cl.
CPC .............. *C09D 5/24* (2013.01); *C01B 32/174* (2017.08); *C01B 32/194* (2017.08);
(Continued)

(58) Field of Classification Search
CPC ... C09D 5/24; C09D 7/20; C09D 7/62; C09D 187/005; C01B 32/174; C01B 32/194;
(Continued)

(56) References Cited

U.S. PATENT DOCUMENTS

2010/0038597 A1*  2/2010  Reynolds ............. H10K 85/115
                                                  252/500
2024/0067794 A1*  2/2024  Yoo ........................ C08K 3/041

FOREIGN PATENT DOCUMENTS

KR    10-1469185 B1    12/2014

OTHER PUBLICATIONS

Chen, Junjie, and Jiecheng Han. "Effect of hydroxylated carbon nanotubes on the thermal and electrical properties of derived epoxy composite materials." Results in Physics 18 (2020): 103246. (Year: 2020).*

(Continued)

*Primary Examiner* — Michael Zhang
(74) *Attorney, Agent, or Firm* — Harness, Dickey & Pierce, P.L.C.

(57) ABSTRACT

The present application relates to a conductive structure formed by connecting a modified graphene oxide or modified carbon nanotube with a conductive polymer, and an antistatic composition including the same. The antistatic composition of the present application has advantages of an excellent adhesive property, improved surface roughness, mechanical strength, and improved electrical properties.

8 Claims, 23 Drawing Sheets

(51) Int. Cl.
*C01B 32/194* (2017.01)
*C01B 32/198* (2017.01)
*C08G 83/00* (2006.01)
*C08K 9/04* (2006.01)
*C09D 7/20* (2018.01)
*C09D 7/62* (2018.01)
*C09D 187/00* (2006.01)

(52) U.S. Cl.
CPC .......... *C01B 32/198* (2017.08); *C08G 83/001* (2013.01); *C08K 9/04* (2013.01); *C09D 7/20* (2018.01); *C09D 7/62* (2018.01); *C09D 187/005* (2013.01); *C01B 2202/06* (2013.01); *C01B 2202/22* (2013.01); *C01P 2002/82* (2013.01); *C01P 2002/85* (2013.01); *C08K 2201/001* (2013.01); *C08K 2201/011* (2013.01)

(58) Field of Classification Search
CPC .............. C01B 32/198; C01B 2202/06; C01B 2202/22; C08G 83/001
See application file for complete search history.

(56) References Cited

OTHER PUBLICATIONS

Christina Valles et al.; "PMMA-grafted graphene nanoplatelets to reinforce the mechanical and thermal properties of PMMA composites", Carbon, 2019, pp. 1-36.
Office Action from corresponding Korean Patent Application No. 10-2021-0150089, dated Jan. 24, 2022.

* cited by examiner

[Formula 6]

[Formula 7]

[Formula 8]

[Formula 9]

[Formula 10]

[Formula 11]

[Reaction Scheme 1]

[Reaction Scheme 2]

[Reaction Scheme 3]

CONDUCTIVE STRUCTURE AND ANTISTATIC COMPOSITION INCLUDING THE SAME

CROSS-REFERENCE TO RELATED APPLICATIONS

This application is a National Phase application of PCT Application No. PCT/KR2021/016512 filed on Nov. 12, 2021 which claims priority to Korean Patent Application Nos. 10-2021-0066193 filed on May 24, 2021 and 10-2021-0150089 filed on Nov. 3, 2021. The entire disclosures of the applications identified in this paragraph are incorporated herein by reference.

TECHNICAL FIELD

The present application relates to a conductive structure and an antistatic composition including the same.

BACKGROUND ART

With the development of modern society, plastics, which are lighter than metal materials, incorrodible and freely formed in various forms, are widely used in everyday products and advanced electronic materials. Most plastics are electrical insulators, and when materials are in contact with each other, rub against each other or are separated from each other, the same amount of charge with different polarities are charged to both sides, easily leading to static electricity.

Such static electricity is one of the factors causing problems in all industrial fields, and it can act as a factor that reduces productivity in a plastic molding process. Particularly, in the semiconductor manufacturing process, a circuit may be damaged by the discharge of static electricity, and there are many problems such as a malfunction of precision products such as communication instruments and major measuring instruments.

Since the problem of static electricity causes malfunctions, it is necessary to solve the problem of contamination and defects caused by harmful materials such as dust. Particularly, since the need for removal of static electricity and contaminant management is emphasized, many studies on antistatic functional materials additionally having electrical conductivity as well as the existing physical properties are in progress.

To prevent the static electricity of such plastics, generally, an antistatic agent is widely used. The antistatic agent may be divided into two methods: an internally-added antistatic agent; and an antistatic agent for surface application.

In relation to the conventional packaging and transport of secondary batteries, an injection-type tray to which an antistatic agent is added was used, but since a new mold must be made and molded according to various models, price competitiveness will be lowered for packaging and transport of many types of secondary batteries. In addition, there is a possibility of foreign matter due to the surface transition of a surfactant. To compensate for this, although solutions using additives with excellent charging performance such as carbon, a carbon-based material and a metal oxide are suggested, when such additives are not properly dispersed, the antistatic function may not be uniformly created on a product surface, so static electricity may not be eliminated Unlike an internally-added antistatic agent, an antistatic agent for surface application, which exhibits an antistatic effect by applying an antistatic coating solution onto a surface using a solution diluted with an organic solvent and water has excellent price competitiveness and can be coated evenly on a surface regardless of a shape, so it is advantageous for forming an antistatic function. However, by the loss of a film coated on the surface, there also has a disadvantage of disappearance of an antistatic effect. Particularly, PEDOT:PSS mainly used as a conductive polymer is easily used in a coating process, but due to the characteristics of the material, it is vulnerable to heat and UV rays, so it has a disadvantage of an antistatic function being significantly degraded within one week or at most 6 months. In addition, because of the used of an organic solvent, there may be a risk of fire due to its volatility.

Therefore, it is necessary to develop an antistatic composition capable of solving the above-described problems, semi-permanently maintaining the function of the antistatic agent, and improving the dispersibility of a conductive additive.

SUMMARY

Technical Problem

A problem to be solved by the present application is directed to providing a conductive structure, which is able to solve the above-described problems, and improve the dispersibility of a carbon material and enhance electrical properties.

Another problem to be solved by the present application is directed to providing an antistatic composition which has favorable effects as a coating solution by improving wear resistance and surface roughness.

Technical Solution

One aspect of the present application provides a conductive structure formed by connecting a modified graphene oxide or modified carbon nanotube with a conductive polymer, in which the modified graphene oxide or modified carbon nanotube has one or more oligomers selected from an acrylic oligomer and a urethane oligomer, which bind to the surface of the graphene oxide or carbon nanotube, and the conductive polymer binds to the oligomer through a branch linkage.

In one embodiment of the present application, the conductive polymer may be selected from the group consisting of polythiophene and a polythiophene derivative, polystyrene and a polystyrene derivative, polyaniline and a polyaniline derivative, polypyrrole and a polypyrrole derivative, and a combination thereof.

In one embodiment of the present application, the conductive polymer may be one or more of poly(3,4-ethylenedioxythiopene) (PEDOT) and polystyrene sulfonic acid (PSS).

In one embodiment of the present application, the PEDOT may have a plurality (more than one) of functional groups having an NH group.

In one embodiment of the present application, the PEDOT unit may be represented by Formula 1, 2 or 3 below.

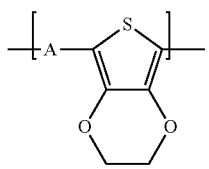

[Formula 1]

-continued

[Formula 2]

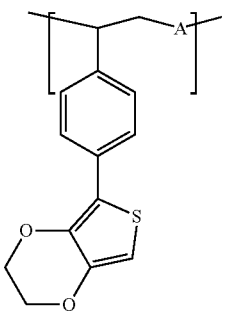

[Formula 3]

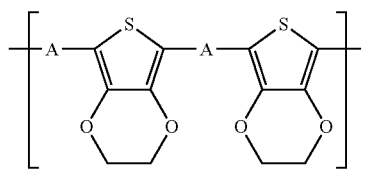

Here, A is

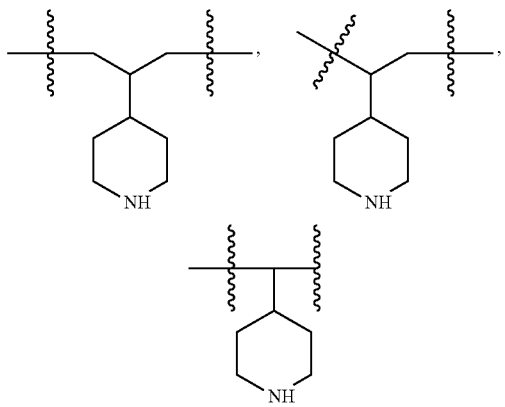

or —NH.

In one embodiment of the present application, the oligomer may include n number of first units with an acrylic group and m number of second units with a urethane group, and each of n and m is an integer of 0 to 1000, and n+m is an integer of 1 to 1000.

In one embodiment of the present application, the first unit may be represented by Formula 4, and the second unit may be represented by Formula 5.

[Formula 4]

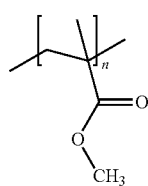

n is an integer of 0 to 1000.

[Formula 5]

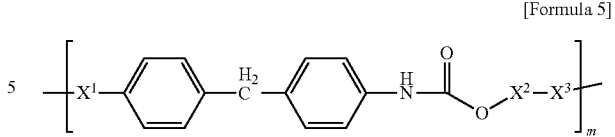

$X^1$ is a direct linkage, or a urethane group or a $C_1$-$C_{10}$ alkylene group, $X^2$ is a $C_1$-$C_{10}$ alkylene group, $X^3$ is a direct linkage, O or S, and m is an integer of 0 to 1000.

In one embodiment of the present application, the modified carbon nanotube may be represented by Formula 6 of FIG. 9

In Formula 6.
R is

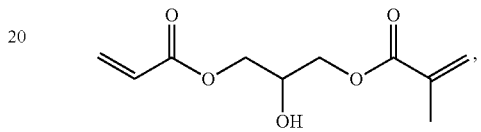

and
each of n and m is independently an integer of 0 to 1000.

In one embodiment of the present application, the modified graphene oxide may be represented by Formula 7 of FIG. 10.

In Formula 7,
R is

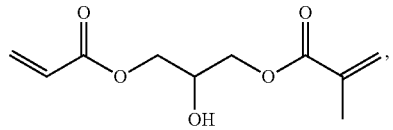

and
each of n and m is independently an integer of 0 to 1000.

In one embodiment of the present application, the modified carbon nanotube or the modified graphene oxide may have one or more functional groups selected from a hydroxyl group (—OH), a formyl group (—CHO), a carbonyl group (—CO), an amine group (—NH$_2$) and a carboxyl group (—COOH) on its surface.

In one embodiment of the present application, the modified carbon nanotube or the modified graphene oxide:the oligomer:the conductive polymer may be linked in a weight ratio of 2:1:8 to 1:0.5:100.

In one embodiment of the present application, the conductive structure may be represented by Formulas 8 to 11 of FIGS. 11 to 14, respectively.

In Formula 8,
R is

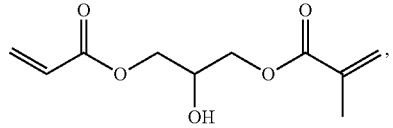

each of n and m is independently an integer of 0 to 1000, and k is an integer of 1 to 10,000,000.

In Formula 9,

R is

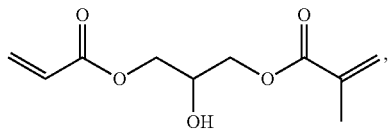

each of n and m is independently an integer of 0 to 1000, and each of k and i is independently an integer of 1 to 10,000,000.

In Formula 10,

R is

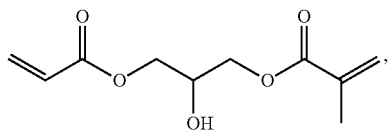

each of n and m is independently an integer of 0 to 1000, and k is an integer of 1 to 10,000,000.

In Formula 11,

R is

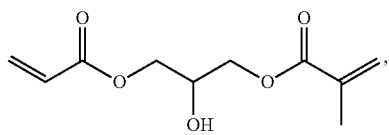

each of n and m is independently an integer of 0 to 1000, and each of k and i is independently an integer of 1 to 10,000,000.

Another aspect of the present application provides an antistatic composition, which includes a conductive structure; and a solvent. Here, the conductive structure is one or more selected from a conductive structure in which the modified graphene oxide is connected to a conductive polymer and a conductive structure in which the modified carbon nanotube is connected to a conductive polymer.

In one embodiment of the present application, the conductive structure may be included at 1 to 50 wt %; and the solvent may be included at 50 to 99 wt % with respect to the total weight of the antistatic composition.

In one embodiment of the present application, the solvent may include water, methanol, ethanol, isopropyl alcohol (IPA), dimethyl sulfoxide (DMSO), propylene glycol methyl ether (PGME), N-methylpyrrolidone (NMP), ethyl-3-ethoxypropionate (EEP), propylene glycol monomethyl ether acetate (PGMEA), butyl carbitol (BC) or a mixture thereof.

In one embodiment of the present application, an antistatic coating film to which the antistatic composition is applied may have a pencil hardness of 2H to 4H.

In one embodiment of the present application, an antistatic coating film to which the antistatic composition is applied may have a surface roughness (Ra) of 0.1 μm to 1 μm.

In one embodiment of the present application, the antistatic coating film to which the antistatic composition is applied may have a surface resistance of $10^3$ ohm/sq to $10^6$ ohm/sq.

Advantageous Effects

The present application has advantages of further enhancing electrical properties, and improving the durability and wear resistance of a conventional antistatic agent by connecting PEDOT and a surface-modified carbon nanomaterial.

The present application also has an advantage of improving dispersibility by direct binding of an acrylic and a urethane oligomer, which can be used as a binder, to a carbon nanomaterial.

The present application also has an advantage of providing an integrated antistatic composition, which includes a carbon-based nanomaterial, a conductive polymer and a solvent, without additionally mixing a binder.

The present application also has an advantage of improving a surface roughness as well as the electrical properties of an antistatic composition and having no elution phenomenon by using a mixture of a surface-modified modified carbon nanotube and a surface-modified graphene oxide, so the antistatic composition can be easily used as a coating solution.

DETAILED DESCRIPTION

Figure 1:
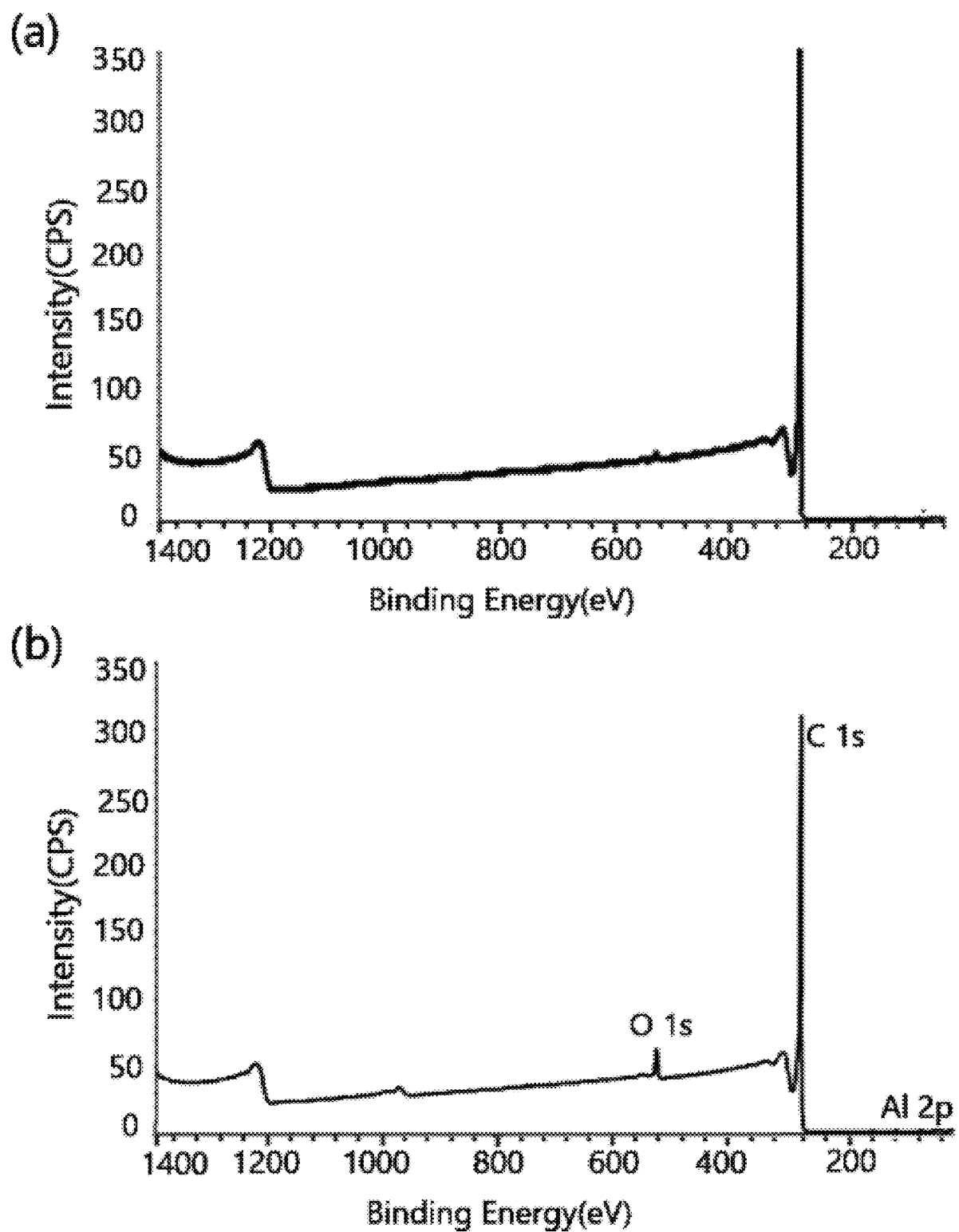
FIG. 1 is an XPS graph showing a functional group by MWCNT acid treatment according to Preparation Example of the present application.

Hereinafter, the present application will be described in further detail.

Specific function descriptions below are merely exemplified to explain embodiments according to the concept of the present application, and embodiments according to the concept of the present application may be implemented in various forms and should not be construed as being limited to the embodiments described herein.

The present application can be modified and implemented in various forms, and therefore, specific embodiments will be described in detail. However, it should be construed that the present application is not limited to specific disclosed forms, and it should be understood that the present application includes all modifications, equivalents and alternatives included in the spirit and scope of the present application.

The terms used in the specification are used only to describe specific examples, not to limit the present application. Singular expressions include plural expressions unless clearly indicated otherwise in the context.

Unless defined otherwise, all terms including technical and scientific terms have the same meanings that are generally understood by those skilled in the art. General terms, such as terms defined in dictionaries, should be interpreted with meanings according to the context of related technology, and should not be interpreted with ideal or excessively formal meanings unless clearly defined herein.

Generally, an antistatic composition or coating solution may further include a binder for forming a coating film. A binder type is not limited, and any one known as a binder for an antistatic coating solution may be used without limitation. A water-soluble or water-dispersible binder resin may be used. As an example of the binder, a polyurethane-based resin, a polyester-based resin, an acryl-based resin, an alkyd-based resin, a polyether-based resin, a melamine-based resin or a cellulose-based resin may be dissolved or dispersed in water, and these resins may be used alone or in combination of two or more thereof in a proper ratio. Specifically, it may be selected from a polyurethane-based resin, a polyester-based resin and an acryl-based resin.

However, a conventional antistatic composition or coating solution prepared by additionally inputting a binder into a main raw material such as a conductive polymer has a disadvantage of lowering the surface roughness, wear resistance and durability of the composition or coating solution.

In order to overcome the above-described disadvantages and provide an integrated composition without an additional binder, an antistatic composition according to the present application may include a conductive structure in which a conductive polymer is connected to a carbon nanomaterial modified with an oligomer.

The modified carbon nanomaterial of the present application may have one or more oligomers selected from an acrylic oligomer and a urethane oligomer, which bind to the surface of the carbon nanotube to a branch linkage. Alternatively, one or more oligomers selected from the acrylic oligomer and the urethane oligomer may bind to the surface of the graphene oxide to a branch linkage.

The conductive polymer of the present application may include one or more of the modified carbon nanotubes and the modified graphene oxide.

That is, the conductive structure of the present application has a conductive polymer connected to the modified carbon nanotube or modified graphene oxide. Specifically, in the present application, the modified carbon nanotube or modified graphene oxide may have one or more oligomers selected from an acrylic oligomer and a urethane oligomer, which bind to the surface of the carbon nanotube or graphene oxide through a branch linkage, and a conductive polymer may be connected to the oligomer.

The antistatic composition of the present application may include the conductive structure and a solvent.

The conductive structure of the present application may be a conductive structure in which the modified graphene oxide is connected to a conductive polymer, or a conductive structure in which the modified carbon nanotube is connected to a conductive polymer, or may include both of them.

In addition, based on the total weight of the antistatic composition, 1 to 50 wt % of the conductive structure; and 50 to 99 wt % of a solvent may be included. In addition, the conductive structure may include 0.1 to 10.0 wt % of the carbon nanotube or the graphene oxide; 30 to 85 wt % of a conductive polymer; and 0.05 to 5 wt % of a binder based on the total weight of the conductive structure.

In one embodiment, the antistatic composition of the present application has an advantage of excellent dispersibility since being prepared in a conductive structure by connecting the carbon nanomaterial, the conductive polymer and the binder oligomer. In addition, the antistatic composition has an advantage of excellent mechanical strength due to high hardness when coated on a specimen. In addition, the surface roughness may be improved to 0.1 μm to 1 μm, and more specifically 0.2 μm to 0.5 μm. The antistatic composition of the present invention has an advantage of remarkable maintenance of antistatic effect due to no change in surface resistance even 6 months after coating with the composition, and excellent wear resistance. On the other hand, when a composition is prepared by separately adding a carbon nanomaterial, a conductive polymer and a binder oligomer, it has reduced dispersibility, and has a problem of reducing effects in terms of mechanical strength, surface roughness, surface resistance and wear resistance.

Conductive Polymer and Conductive Structure

The conductive polymer may include one selected from the group consisting of polythiophene, a polythiophene derivative such as poly(3,4-ethylenedioxythiophene) (PEDOT), polystyrene, a polystyrene derivative, polyaniline, a polyaniline derivative, polypyrrole, a polypyrrole derivative, and a combination thereof.

Specifically, the conductive polymer may be PEDOT. In addition, a modified conductive polymer prepared from PEDOT may be used. Specifically, modified conductive polymers such as polythiophene substituted with a $C_4$ to $C_{10}$ alkyl group or polythiophene substituted with an ethylenedioxy group may be used.

In one embodiment, the conductive polymer may be PEDOT:PSS which is doped with a polyanion such as polystyrene sulfonate (PSS). Such PEDOT:PSS may be provided in the form of an aqueous dispersion dispersed in an aqueous solution. In addition, PEDOT:PSS may be one of the water-based conductive polymers and have high conductivity, and may be dispersed in water to be an aqueous solution.

In another embodiment, the PEDOT and the PSS may be individually added. In this case, by interaction generated in a preparation process, the PEDOT and the PSS may be connected to each other.

The conductive structure of the present application is a conductive structure formed by connecting a conductive polymer to a modified carbon nanotube or modified graphene oxide. That is, the modified carbon nanotube or modified graphene oxide refers to a carbon nanotube or graphene oxide which has one or more oligomers selected from an acrylic oligomer and a urethane oligomer binding to its surface through a branch linkage, and the conductive structure is formed by connecting a conductive polymer to the oligomer.

Due to the conductive structure, A structure in which a conductive polymer and a carbon nanomaterial are previously connected may be formed. Therefore, an integrated antistatic composition, which has improved dispersibility and does not need an additional binder, may be prepared.

The PEDOT which is the conductive polymer of the present application, may have one or more functional groups having an NH group on their surface, and may be represented by Formula 1 or 2 below.

[Formula 1]

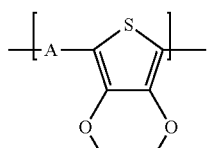

[Formula 2]

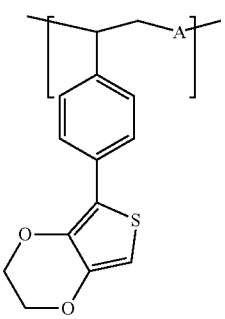

In Formula 1 or 2, A is

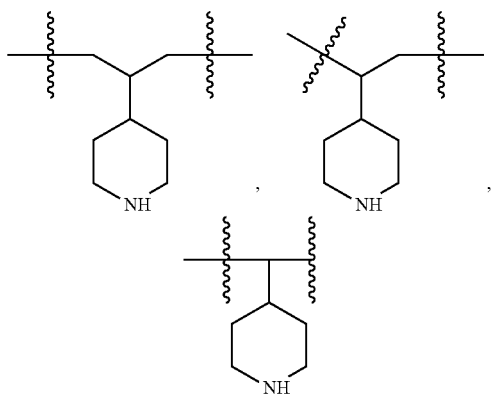

or —NH.

Specifically, the conductive polymer of the present application may have 4-isopropyl-piperidine binding to the PEDOT, and may be represented by Formula 2. More specifically, the following conductive polymer may be 4-(1-(7-ethyl-2,3-dihydrothieno[3,4-b][1,4]dioxin-5-yl) butan-2-yl) piperidine) represented by Formula 1-2 below.

[Formula 1-2]

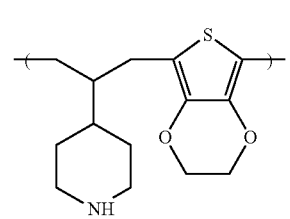

As the conductive polymer of the present application, in the PEDOT having a functional group with an NH group, the NH group may be exposed, and via the NH group, an acrylic oligomer or a urethane oligomer may have a hydrogen bond with the NH group.

According to one embodiment of the present application, the antistatic composition includes 1 to 40 wt %, and more specifically, 20 to 30 wt % of a dispersion of the conductive polymer (PEDOT:PSS). When the dispersion of the conductive polymer (PEDOT:PSS) is included in the above-described range, desired electric conductivity may be obtained.

The conductive polymer (PEDOT:PSS) has ethylenedioxy groups located around a thiophene structure in a ring shape, and has excellent stability against air or heat.

In addition, due to the electron donating effect by ethylenedioxy groups substituted at the $3^{rd}$ and $4^{th}$ positions, the PEDOT:PSS has a lower optical band gap (760 nm to 780 nm or 1.6 eV to 1.7 eV) than thiophene, can be changed a color depending on the potential difference of oxidation/reduction, and can ensure transparency because of the existence of an absorption band in the infrared region in an oxidation state.

The conductive structure of the present application may be represented by Formulas 8 to 11 of FIGS. 11 to 14, respectively.

In Formulas 8 to 11, R is

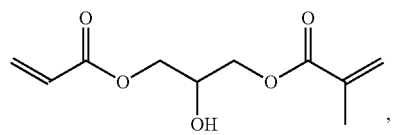

in which each of n and m may be independently an integer of 0 to 1000, more specifically, an integer of 1 to 1,000, and still more specifically an integer of 10 to 1,000. Each of k and i may be independently an integer of 1 to 10,000,000, and more specifically an integer of 100 to 10,000.

In the conductive structure of the present application, the modified carbon nanotube or modified graphene oxide: the oligomer; and the conductive polymer may be connected to a weight ratio of 2:1:8 to 1:0.2:100, more specifically, 2:1:30 to 3:1:120, and still more preferably, 2:1:100. The conductive structure prepared in the above-described weight ratio may have improved permeability, and may be evenly dispersed on a surface.

The conductive structure may include 0.1 to 20.0 wt % of one or more selected from the modified carbon nanotube and the modified graphene oxide; 30 to 85 wt % of the conductive polymer; and 0.05 to 10 wt % of the oligomer based on the total weight of the conductive structure.

Carbon Nanotube and Graphene Oxide

The carbon nanomaterial of the present application includes a carbon nanotube or graphene oxide.

In the present application, the term "carbon nanotube (CNT)" refers to carbon allotropes having a cylindrical nanostructure with a diameter of several nanometers. The cylindrical nanostructure has a high length-to-diameter ratio of $10^3:1$ to $10_6:1$. Since such a cylindrical carbon molecule has specific properties, the carbon nanotube is important in technical fields including nanotechnology, electronics, optics and material science. Particularly, the carbon nanotube has excellent thermal conductivity and excellent mechanical and electrical properties, so it can be used as an additive in various structural materials. Structurally, in a carbon nanotube, one carbon atom has $sp^2$ hybridization with three different surrounding carbon atoms, thereby forming a hexagonal honeycomb pattern. The carbon nanotubes are broadly classified into a single-walled nanotube (SWNT) and a multi-walled nanotube (MWCNT). The carbon nanotubes may be aligned in a rope form by the Van der Waals force, and more specifically, pi-stacking. As described above, since a carbon nanotube is formed by strong $sp^2$ bonding, rather than single bonds, that is, $sp^3$ bonding, it may exhibit characteristic high strength. Therefore, as the ratio of carbon nanotubes in the composite increases, physical properties may be improved.

Graphene has a two-dimensional carbon nanostructure, and is applied to various applications due to excellent electrical, thermal and mechanical properties. Graphene oxide (GO) chemically converted from graphite is effective since it is capable of being mass-produced at low cost.

Graphene oxide has a structure having hexagon-shaped cyclic carbons including $sp^2$ hybridized carbons with a hydroxyl group and an epoxide group and $sp^3$ hybridized carbons with a hydroxyl group and an epoxide group at both sides of a sheet, and carboxyl groups (—COOH) and carbonyl groups (—CO) at edges. Since a graphene sheet is a material with a high specific surface area, when not well dispersed, it tends to return to a graphite structure by forming an aggregate by the Van der Waals interaction. Since most intrinsic properties are associated with an individual sheet of graphene, the prevention of aggregation of the graphene sheets is particularly important. This aggregation may be reduced by binding other molecules or polymers on the sheets.

As described above, it is difficult for the carbon nanotube and graphene oxide to change properties or provide other physical properties. This makes it difficult for the carbon nanotube and the graphene oxide to form a composite with other materials. In addition, due to low dispersibility, a technology or treatment for dispersing the carbon nanotubes and the graphene oxide in an organic or inorganic solvent is needed.

The modified carbon nanotube and the modified graphene oxide of the present application have high strength and improved dispersibility. In addition, to integrate with a conductive material without addition of a binder, an acrylic oligomer and a urethane oligomer bind to the surfaces of the carbon nanotube and the graphene oxide.

According to one embodiment of the present application, the modified carbon nanotube or the modified graphene oxide may have one or more functional groups selected from a hydroxyl group (—OH), a formyl group (—CHO), a carbonyl group (—CO), an amide group (—NH$_2$) and a carboxyl group (—COOH) on the surface of the modified carbon nanotube or the modified graphene oxide. The modified carbon nanotube or modified graphene oxide may be bonded with an acrylic oligomer or urethane oligomer by the functional group.

More specifically, the carbon nanotube may be treated with an acid for approximately 10 to 30 minutes to introduce a functional group such as a hydroxyl group (—OH) or a carboxyl group (—COOH) on its surface. The acid treatment is performed for a time that can minimize the damage to the carbon nanotube and maximize the introduction of a functional group.

According to another embodiment, the acid treatment may be performed simultaneously with ultrasonic treatment. Here, since energy of approximately 45,000 J to 80,000 J may be applied to the carbon nanotube by the ultrasonic treatment, the introduction of the functional group may be maximized while minimizing damage to the carbon nanotube. In addition, it is possible to improve the reproducibility of repeating the preparation of the modified carbon nanotube which has the aspect ratio described above and to which a predetermined amount of functional groups is introduced. Specifically, when the modified carbon nanotube is prepared by acid treatment as described above, the reproducibility error of the atomic % content of a functional group-substituted carbon atom may be within approximately 3%.

The acid treatment may be performed using an acid solution, for example, a mixed solution of nitric acid and sulfuric acid, and the acid concentration of the mixed solution may be 10 wt % to 60 wt %. The acid treatment may be performed at a temperature of 20° C. to 60° C.

The modified carbon nanotube or graphene oxide modified with functional groups may be prepared by a reaction of an acrylic oligomer and a urethane oligomer. More specifically, the preparation method is not particularly limited as long as the modified carbon nanomaterial can be prepared by a condensation reaction or a radical reaction between the carbon nanomaterial and oligomers.

According to one embodiment of the present application, the carbon nanomaterial bonded with the oligomer through a branch linkage may be included at 0.15 to 30 wt % with respect to the total conductive structure. For example, when the content of the carbon nanotubes forming a branch linkage with an acrylic oligomer and a urethane oligomer is less than 0.15 wt %, a physical property-improving effect, such as improved strength, by the addition of carbon nanotubes is insignificant. In addition, when the content of the carbon nanotubes is more than 30.0 wt %, due to the conductivity of the carbon nanotube, electrical disconnection may occur, so there is a disadvantage of difficulty in use of the carbon nanomaterial as an ion conductive electrolyte membrane.

Oligomer

According to one embodiment of the present application, the oligomer may include n number of first units with an acrylic group and m number of second units with a urethane group. n and m may be integers of 0 to 1000, and n+m may be an integer of 1 to 1000. More specifically, n and m may be integers of 0 to 100, and n+m may be an integer of 10 to 100. The oligomer having the above-mentioned integer value may be improved in physical properties, such as improved surface roughness and increased dispersibility.

In addition, the first unit is represented by Formula 4, and the second unit is represented by Formula 5.

[Formula 4]

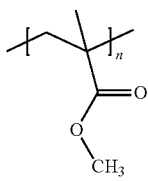

n is an integer of 0 to 1000.

[Formula 5]

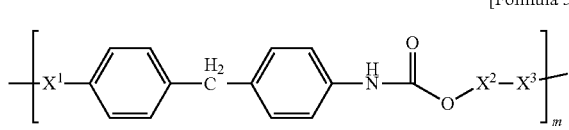

$X^1$ is a direct linkage, a urethane group or a $C_1$-$C_{10}$ alkylene group. $X^2$ is a $C_1$-$C_{10}$ alkylene group.

Specifically, the $C_1$-$C_{10}$ alkylene group may be $C_1$ to $C_5$, and more specifically, a methylene group, an ethylene group, a propylene group, a butylene group or a pentylene group.

$X^3$ is a direct linkage, O or S, and m is an integer of 0 to 1000.

In one embodiment of the present application, the oligomer and the carbon nanomaterial may be bonded in a ratio of 1:2 to 1:5. More specifically, the oligomer and the carbon nanomaterial may be bonded in a ratio of 1:2 to 1:2.5. In one embodiment of the present application, the oligomer may be included at 25 wt % to 50 wt % with respect to the total weight of the carbon nanomaterial. Since the oligomer may serve as a binder, it has an effect of improving electrical conductivity without adding a separate binder.

In addition, the antistatic composition of the present application may have excellent adhesive strength and improved surface roughness by bonding the oligomer to a carbon nanomaterial. In addition, since pencil hardness and wear resistance are improved, excellent mechanical strength may be exhibited. In addition, there may have an advantage of preventing an elution phenomenon, which is a phenomenon of leaking carbon nanotubes or graphene on the surface.

In addition, the acrylic oligomer may have a number average molecular weight (Mn) of 3,000 to 30,000 g/mol, and more specifically, 5,000 to 15,000 g/mol, but the present application is not limited thereto. When the molecular weight of the acrylic oligomer is less than 5,000 g/mol, the carbon nanotubes which have a branch linkage with the oligomer do not have enough acrylic groups to form a sufficiently even and flat surface, or to have high adhesive strength. In addition, when the molecular weight of the acrylic oligomer is more than 15,000 g/mol, due to steric hindrance caused by the enlargement of the molecular structure of the oligomer itself, it may be difficult for the acrylic oligomer to bond with the carbon nanotube.

In addition, the urethane oligomer may have a number average molecular weight (Mn) of 3,000 to 30,000 g/mol, and more specifically, 5,000 to 15,000 g/mol, but the present application is not limited thereto.

Additive

The antistatic composition of the present application may further include a chemical additive. N,N-dimethyletha-nolamine (DMEA) is an additive for adjusting pH, and may be used to improve the dispersibility and storage property of the antistatic composition. In this case, at pH 7, the adhesive property and storage property of the antistatic composition are improved. Since 2,5,8,11-tetramethyl-6-dodecyn-5,8-diol-ethoxylate as a surfactant that reduces surface tension, the wettability of the antistatic composition may be improved, and the dispersibility thereof may increase. The amount of the additive used may be in a range of 0.1 to 10.0 wt % with respect to the total weight of the antistatic composition. When the amount of the additive used is less than 0.1 wt %, there are problems of degradation in dispersity of the antistatic composition, and low storage stability thereof. In addition, when the amount of the additive used herein is more than 10.0 wt %, there are problems of reduced antistatic effect and reduced coating property because of increased surface resistance.

Solvent

The antistatic composition according to the present application may include 50 to 99 wt % of a solvent based on the total weight of the antistatic composition. The solvent may be used by mixing water and an organic solvent. The organic solvent may include an alcohol-based organic solvent and a functional organic solvent. In addition, the organic solvent may be included in a content ratio of 2:1 to 4:1 with respect to water. Outside the content ratio, the antistatic composition may not be properly dispersed and may have problems of reduced dispersion stability and prolonged drying time, and productivity of the composition may be reduced.

The organic solvent serves to improve a coating property such as the drying property of the antistatic composition. Generally, when distilled water is sprayed as the coating solution in a roll-to-roll process, it may affect a heat drying speed. Therefore, the water may be mixed with an alcohol-based solvent. The alcohol-based solvent may be widely used alcohol compounds conventionally used in an antistatic composition or polymer coating composition and specifically, one or more selected from $C_1$ to $C_5$ aliphatic alcohols may be used. More specifically, methanol, ethanol, isopropyl alcohol (IPA) or a mixture thereof may be used, and even more specifically, a solvent mixture prepared by mixing ethanol and IPA may be used.

The content of the alcohol-based solvent may be 5 to 40 wt %, and specifically 10 to 30 wt % with respect to the total antistatic composition. When the content of the alcohol-based solvent is less than 5 wt % with respect to the total antistatic composition, there is a concern that the drying property may be degraded, and when the content of the alcohol-based solvent is more than 40 wt %, there is a problem of increased surface resistance because of reduced dispersibility of the conductive polymer.

The antistatic composition according to the present application includes a functional organic solvent, which further improves the coating properties of the coating composition, such as solubility, dispersibility, drying property and film uniformity, in addition to the alcohol-based solvent. As the functional organic solvent, dimethyl sulfoxide (DMSO), propylene glycol methyl ether (PGME), N-methylpyrrolidone (NMP), ethyl-3-ethoxypropionate (EEP), propylene glycol monomethyl ether acetate (PGMEA), butyl carbitol (BC) or a mixture thereof may be used, and specifically dimethyl sulfoxide is used.

The content of the functional organic solvent may be 5 to 30 wt % with respect to the total coating composition. Specifically, the content of the functional organic solvent is 10 to 30 wt %. When the content of the functional organic solvent is less than 5 wt %, the coating property of the coating composition is degraded, and thus a problem of forming a non-uniform film occurs, and when the content of the functional organic solvent is more than 30 wt %, there is a problem of reducing a drying property without significant improvement in the coating property.

Hereinafter, preferred Preparation examples and Experimental Examples are presented to help understand the present application. However, the following Preparation Examples and Experimental Examples are merely provided to help the understanding of the present application, and the present application is not limited thereto.

<Preparation Example 1> Preparation of Modified Carbon Nanotubes (MWCNTs)

In the present application, a composite suitable for antistatic coating to which multi-wall carbon nanotubes (MWCNTs) are added by introducing a large amount of methacrylate groups enabling free radical polymerization on the surface of the MWCNT and then introducing a large amount of urethane groups enabling condensation polymerization may be prepared.

Step 1: Preparation of MWCNT-$NH_2$

Figure 15:
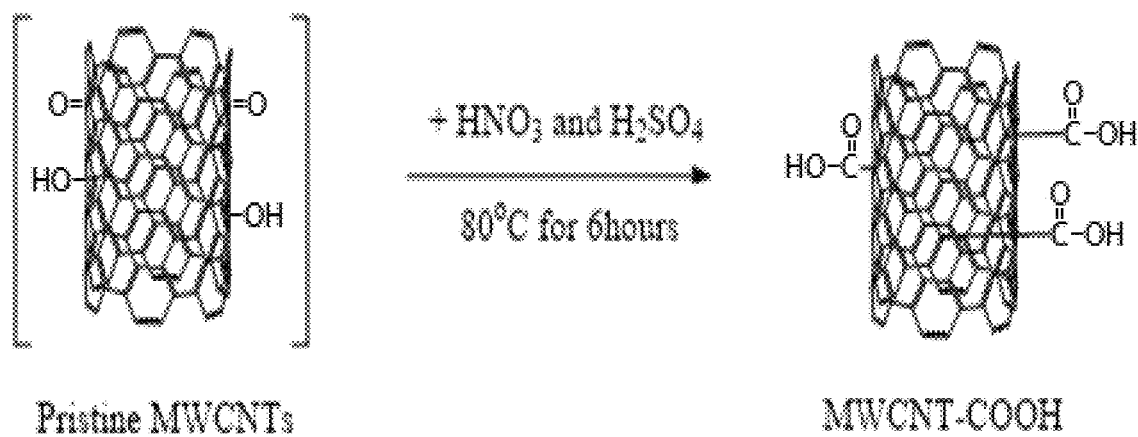
FIG. 15 is an illustration of Reaction Scheme 1.

[Reaction Scheme 1] of FIG. 15

MWCNT-COOH was prepared according to the process of Reaction Scheme 1.

The CNTs used in the present application are MWCNTs of NC®-7000 (Nanocyl, Belgium), which are products made by a catalytic carbon vapor deposition (CCVD) method, have an average diameter of 9.5 nm, an average length of 1.5 µm and an aspect ratio of 160. Since the MWCNTs prepared by the CCVD method were made using a large amount of metal catalyst, approximately 10 g of MWCNTs (50:1) in 500 mL of nitric acid were treated by ultrasonication at 60° C. for 2 hours and sufficiently washed with distilled water until the pH value became approximately 6.8, and then the product after washing was completed was dried in an 80° C. vacuum oven for 36 hours, thereby preparing pure MWCNTs. Referring to Reaction Scheme 1, to form a carboxyl group (—COOH) in the purely washed MWCNT, sulfuric acid ($H_2SO_4$) (97.0%, SAMCHUN Chemical Co., Ltd., Sulfuric acid) and nitric acid ($HNO_3$) (60.0%, SAMCHUN CHEMICALS, Nitric acid (Sp.Gr.1.38)) were mixed in a molar ratio of 1:3, and stirred at 80° C. for 6 hours, followed by ultrasonic cleaning for 2 hours. In the same manner as obtaining the pure MWCNTs, MWCNT-COOH in which a carboxyl group (—COOH) was introduced on the surface of the carbon nanotube was prepared by sufficiently performing a washing process with distilled water and a drying process.

FIG. 1 is an XPS graph showing a functional group by acid treatment according to Example of the present application.

FIG. 1(a) is an XPS spectrum of pure MWCNTs prepared by performing ultrasonication of approximately 10 g of MWCNTs (50:1) in 500 mL of nitric acid at 60° C. for 2 hours, sufficiently washing the resulting MWCNTs with distilled water until the pH value becomes approximately 6.8, and drying the resulting product in an 80° C. vacuum oven for 36 hours, and FIG. 1(b) is an XPS spectrum of MWCNTs which were treated with an acid by mixing sulfuric acid ($H_2SO_4$) and nitric acid ($HNO_3$) in a molar ratio of 1:3, stirring the mixture at 80° C. for 6 hours and ultrasonic cleaning for 2 hours. In the XPS spectrum of MWCNTs before modification, a smooth spectrum was observed, and in the XPS spectrum after modification, a peak made by a C=O group was observed, confirming that the C=O group of a carboxyl group (—COOH) is introduced by oxidation on the MWCNT surface.

Figure 16:
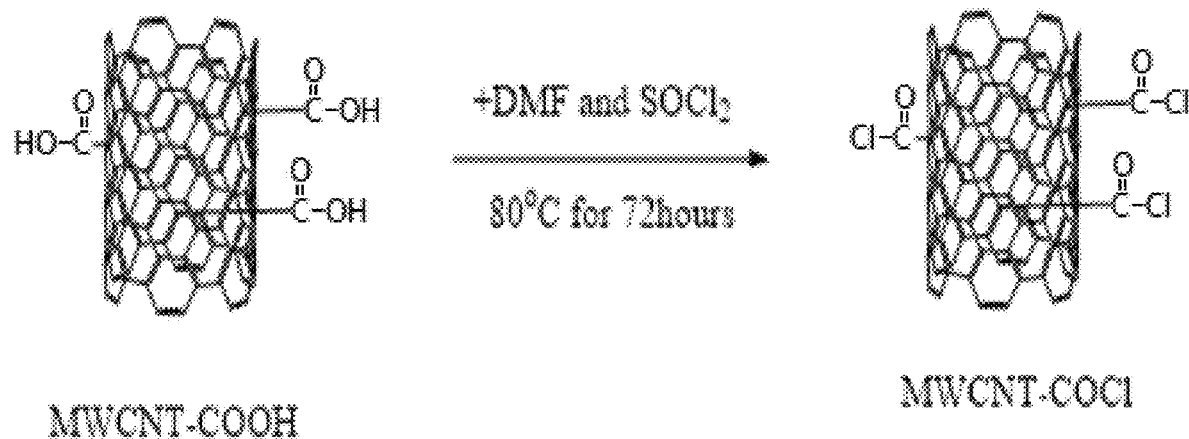
FIG. 16 is an illustration of Reaction Scheme 2.

[Reaction Scheme 2] of FIG. 16

According to Reaction Scheme 2, in order for an amine group (—$NH_2$) to be easily introduced into the oxidized carbon nanotube (MWCNT-COOH), the oxidized carbon nanotube was mixed with N,N-dimethylformamide (DMF) (99.5%, Junsei Chemical Co., Ltd., N,N-dimethylformamide) and thionylchloride ($SOCl_2$) (EP, SAMCHUN Chemical Co., Ltd., Thionyl Chloride) in a volume ratio of 1:20 and stirred at 300 rpm and 80° C. for 72 hours. After the reaction was completed, since S is weak against water, the resulting product was sufficiently diluted using tetrahydrofuran (THF) (99.9%, SAMCHUN Chemical Co., Ltd.) and then dried in a vacuum oven at room temperature.

Figure 17:
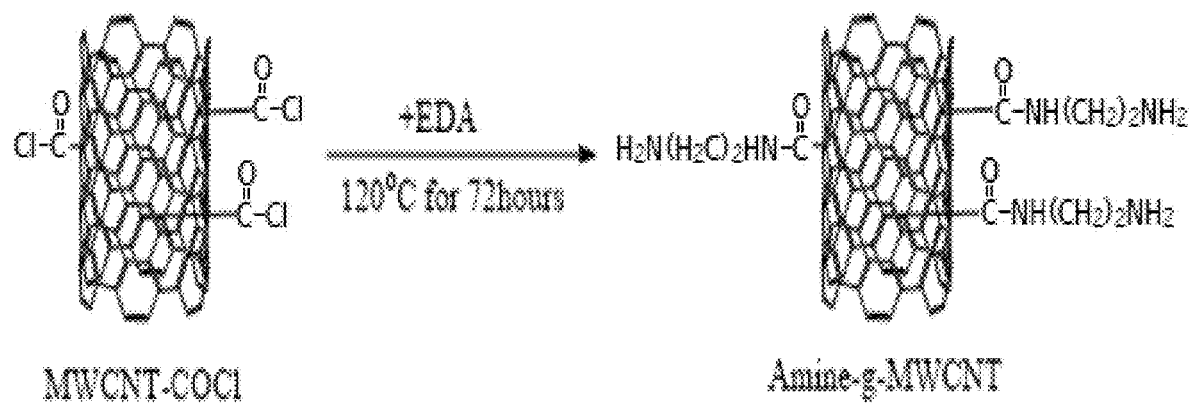
FIG. 17 is an illustration of Reaction Scheme 3.

[Reaction Scheme 3] of FIG. 17

According to Reaction Scheme 3, to introduce the final functional group, an amine group (—$NH_2$), to MWCNT-COCl, a reaction was carried out with TEA and excessive EDA at 120° C. for 96 hours, and after the reaction was completed, to eliminate unreacted amines, washing was performed by stirring for 4 hours using a sufficiently large amount of ethanol, thereby preparing the final product.

Figure 2:
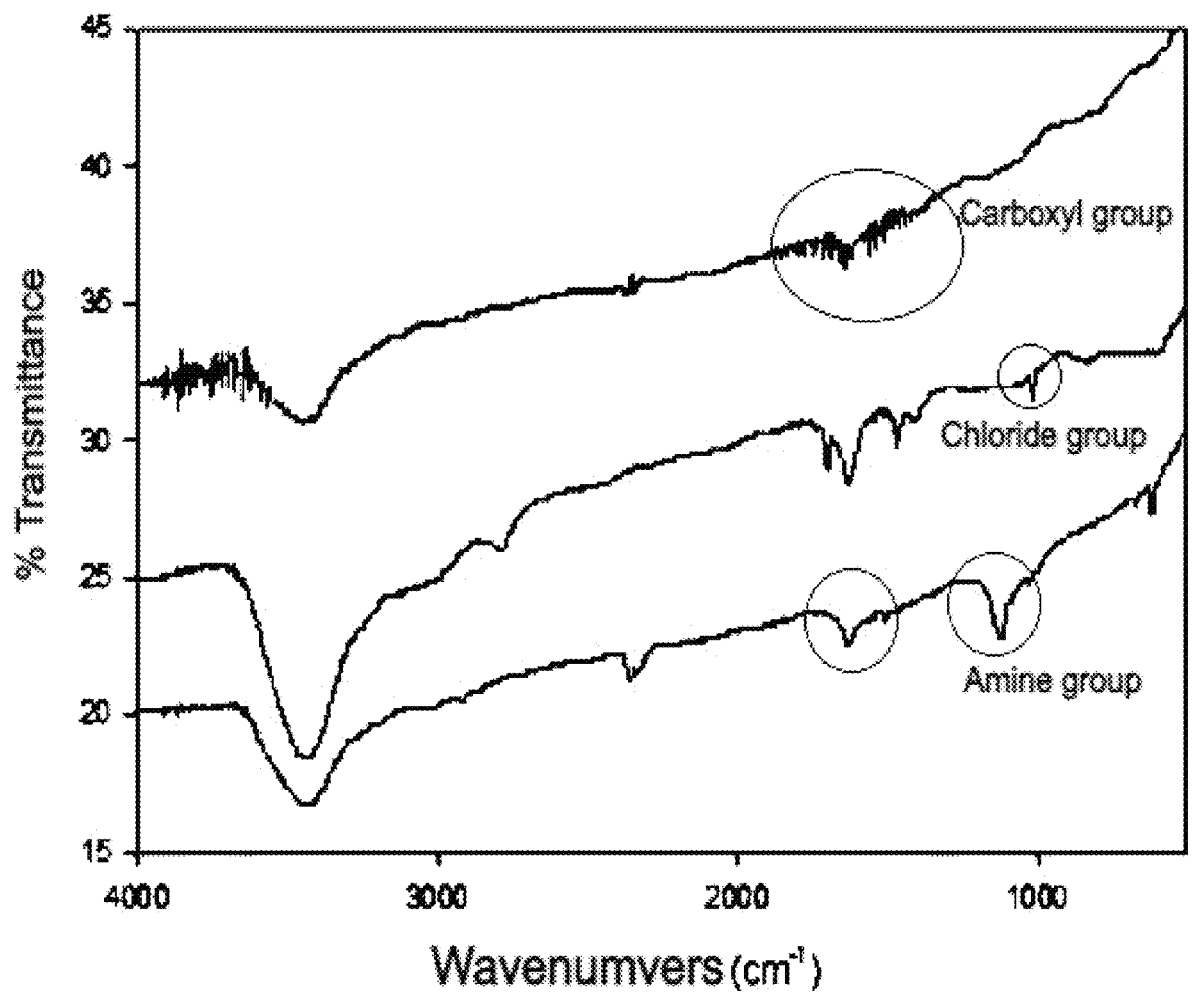
FIG. 2 is an infrared spectroscopic analysis graph of MWCNT according to Preparation Example of the present application.

The infrared spectroscopic analysis graph of MWCNT according to Example of the present application is shown in FIG. 2. In FIG. 2, MWCNTs having a carboxyl group was identified by a typical C=O bond peak near 1700 $cm^{-1}$ and a C—O peak near 1300 cm 1, and a chloride group was identified by a peak reaction at 1000 $cm^{-1}$, and an amine, which is the most important result in this graph, was able to be confirmed by a C—N peak near 1350 $cm^{-1}$ and a N—H bending motion at 1600 $cm^{-1}$.

Figure 3:
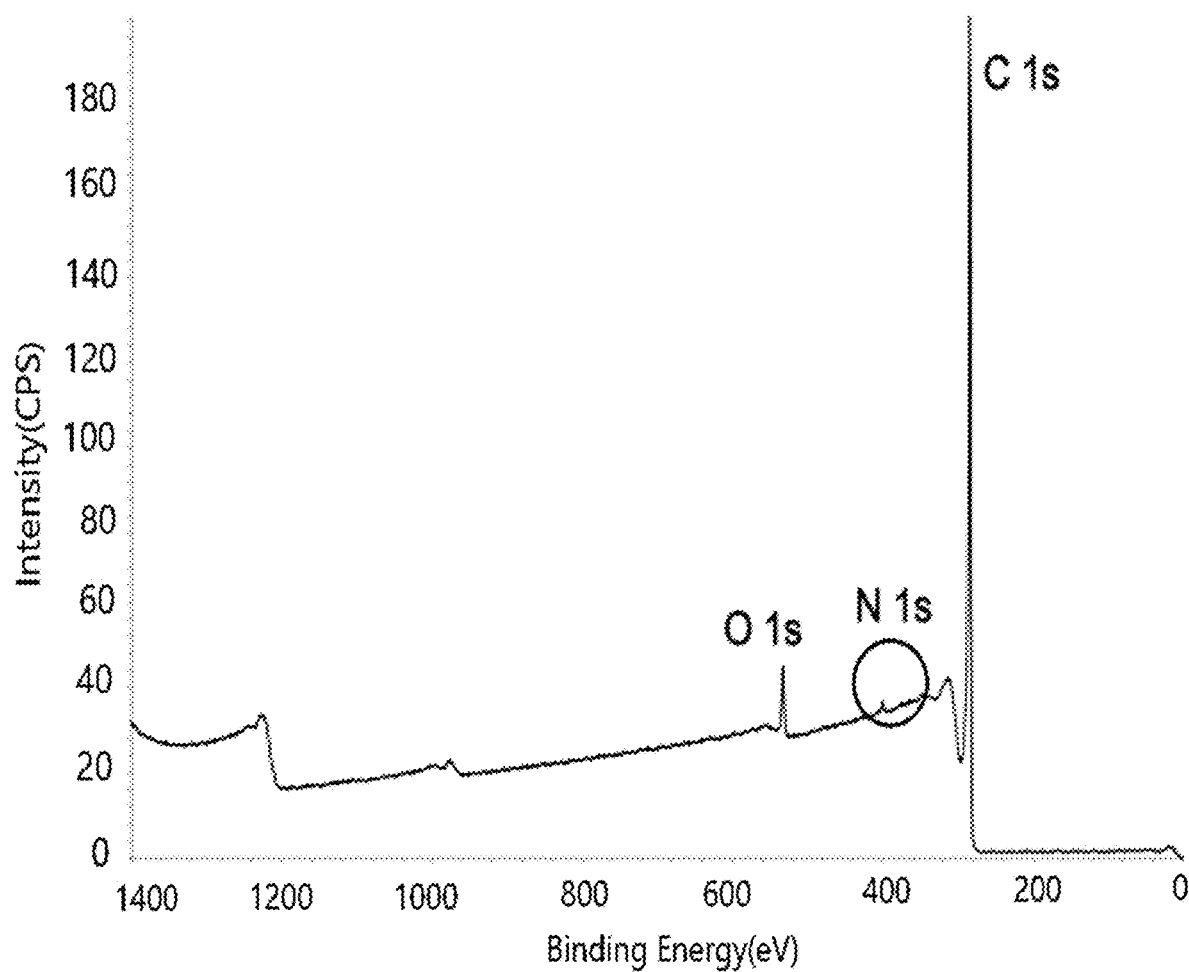
FIG. 3 is an XPS graph after substitution of MWCNT according to Preparation Example of the present application with an amino group (—$NH_2$).

The XPS graph after substitution with an amino group (—$NH_2$) according to Example of the present application is shown in FIG. 3. In FIG. 3, a peak caused by MWCNT-$NH_2$ was observed in the XPS spectrum.

Step 2: Preparation of MWCNT-PMMA

Figure 18:
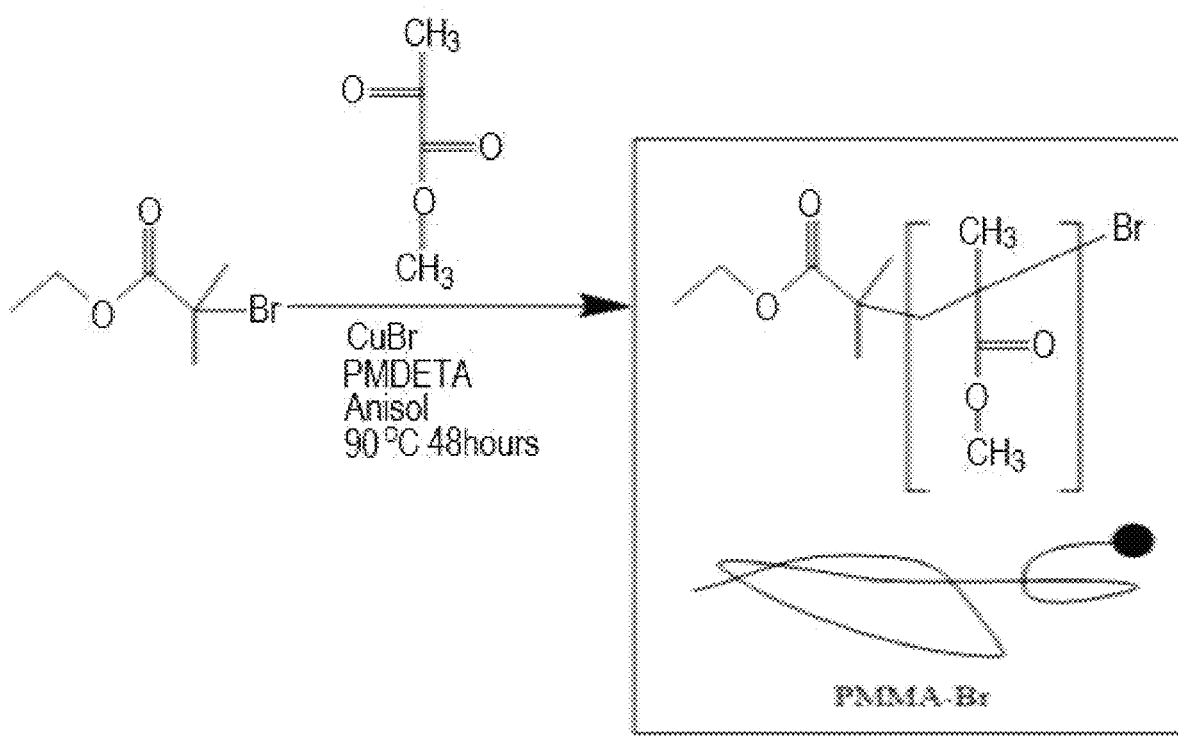
FIG. 18 is an illustration of Reaction Scheme 4.

[Reaction Scheme 4] of FIG. 18

Figure 19:
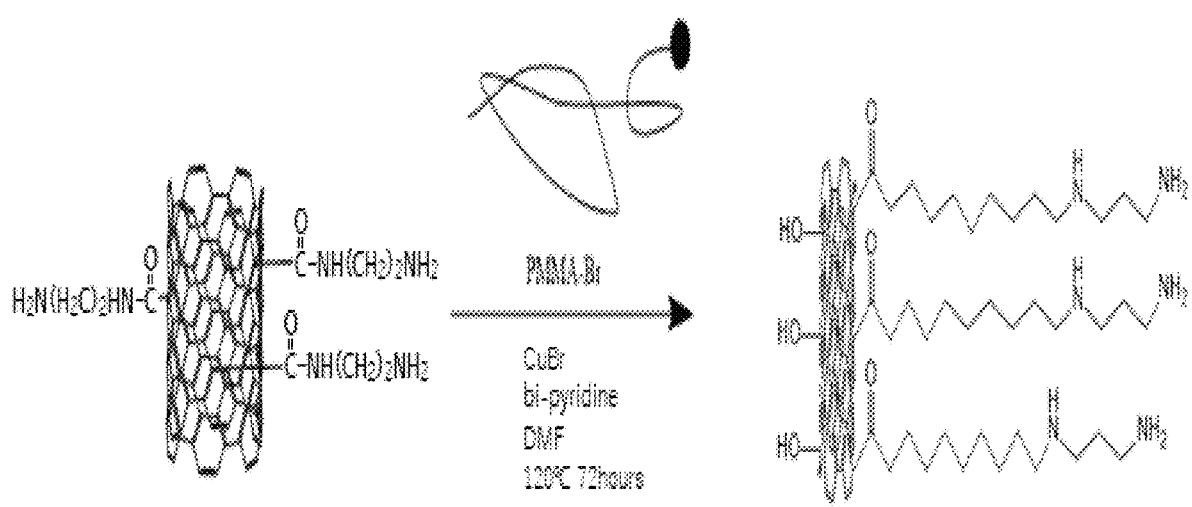
FIG. 19 is an illustration of Reaction Scheme 5.

[Reaction Scheme 5] of FIG. 19

PMMA-Br was prepared according to Reaction Scheme 4, and MWCNT-$NH_2$ was prepared according to Reaction Scheme 5.

A method of preparing MWCNT-PMMA used in the present application was designed by applying the "grafting-to" method. As shown in the Reaction Scheme 5, after the chemical treatment of MWCNT with $NH_2$, an intermediate acting as an initiator was prepared, and MWCNT-PMMA was prepared by applying the ATRP synthesis method as the "grafting-from" method. For the preparation process applying the ATRP reaction as the "grafting-from" method, a process of preparing PMMA-Br acting as an initiator to which a Br group is introduced on the PMMA surface must be preceded. First, oxygen was removed by purging nitrogen in a reactor, and then MMA and CuBr, pentamethyldiethylene triamine (PMDTEA), ethyl-2-bromoisobutylate, and anhydrous anisole as a solvent were added and reacted together at 90° C. Here, the ethyl-2-bromoisobutylate, CuBr, PMDTEA and MMA are added in a ratio of 1:1:1:200 Mmol. Unreacted substances of PMMA-Br made by the reaction for approximately 48 hours and a metal catalyst were removed using a column, and a solvent was removed from the resulting solution using a rotary evaporator. The solvent-removed PMMA-Br was precipitated in excessive MeOH and filtered through a filter, and then sufficiently dried in a room temperature vacuum oven for 48 hours. The prepared PMMA-Br, MWCNT-$NH_2$, CuBr, bi-pyridine and DMF were added and subjected to an ATRP reaction at 120° C. for 72 hours. After the reaction was completed, the resulting product was diluted in chloroform, and then a solid content was filtered using a membrane filter. The finally obtained solid content was washed several times with chloroform, precipitated in excessive MeOH to filtrate a solid content again, and dried in a vacuum oven at 60° C. for 48 hours, thereby obtaining a final composite.
Step 3: Preparation of TPU Oligomer

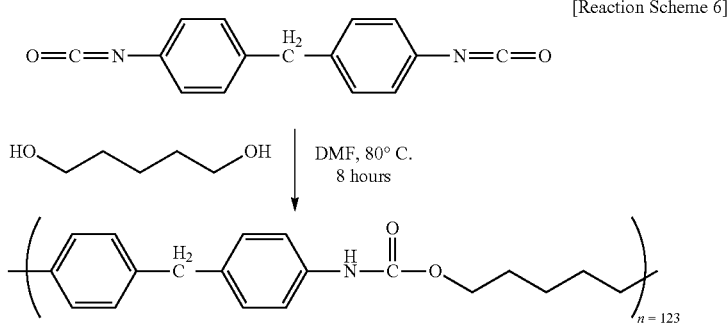

[Reaction Scheme 6]

A TPU oligomer was prepared according to the procedure of Reaction Scheme 6.

Figure 20:
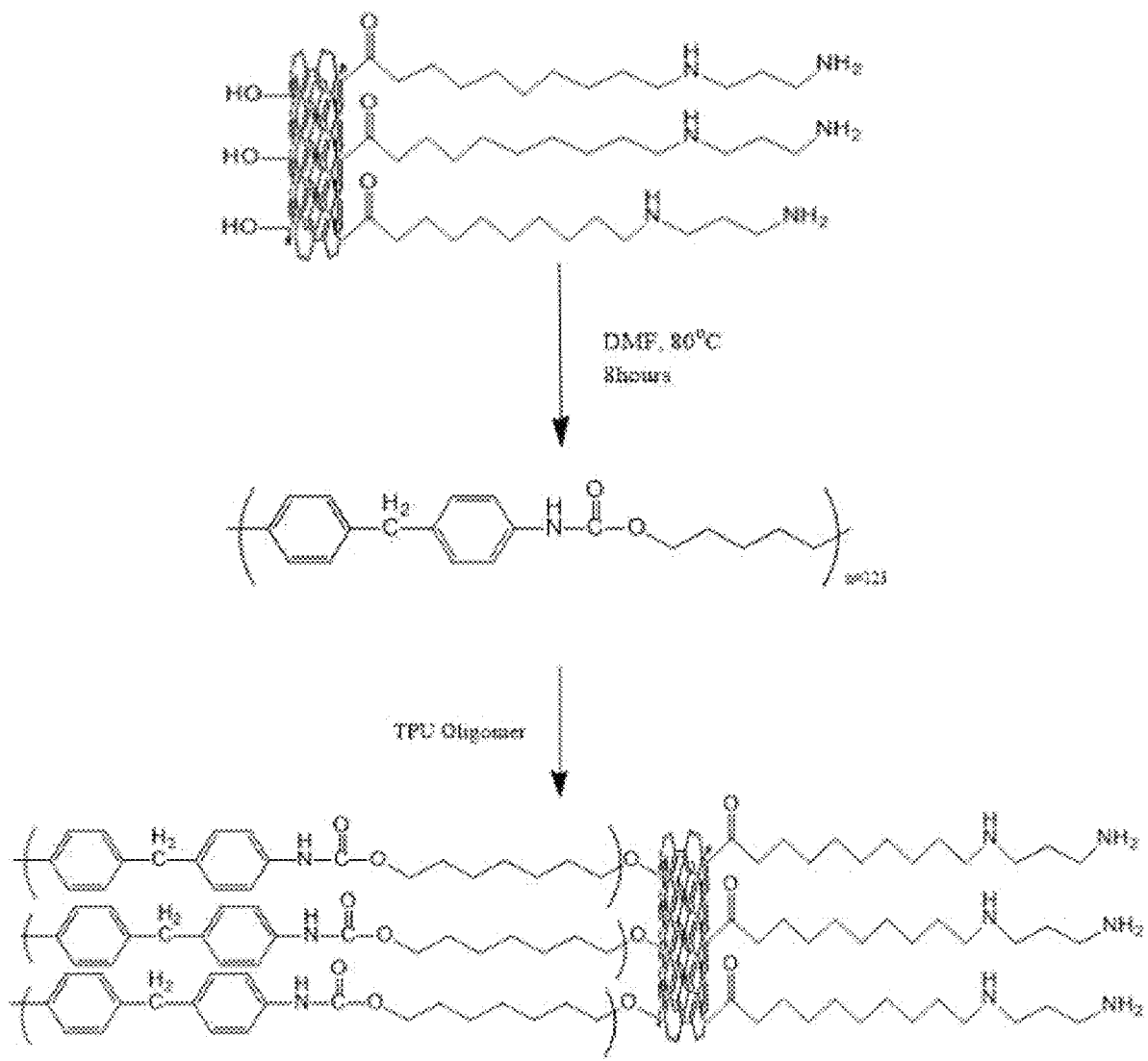
FIG. 20 is an illustration of Reaction Scheme 7.

26.4 g of heptane-1,7-diol and 50 g of bis(4-isocyanatophenl)methane were prepared in a molar ratio of NCO:OH=1:1 and subjected to polymerization using 300 ml of dimethylformamide (DMF) as a solvent through solution polymerization at 80° C. for approximately 8 hours. The compound for which the polymerization process was completed was precipitated in distilled water, washed five times with distilled water, and subjected to vacuum drying at 80° C. for 24 hours while the temperature did not increase, thereby preparing a TPU oligomer compound.
Step 4: Preparation of TPU-CNT-PMMA
[Reaction Scheme 7] of FIG. 20
TPU-CNT-PMMA was prepared according to the process of Reaction Scheme 7.

Figure 21:
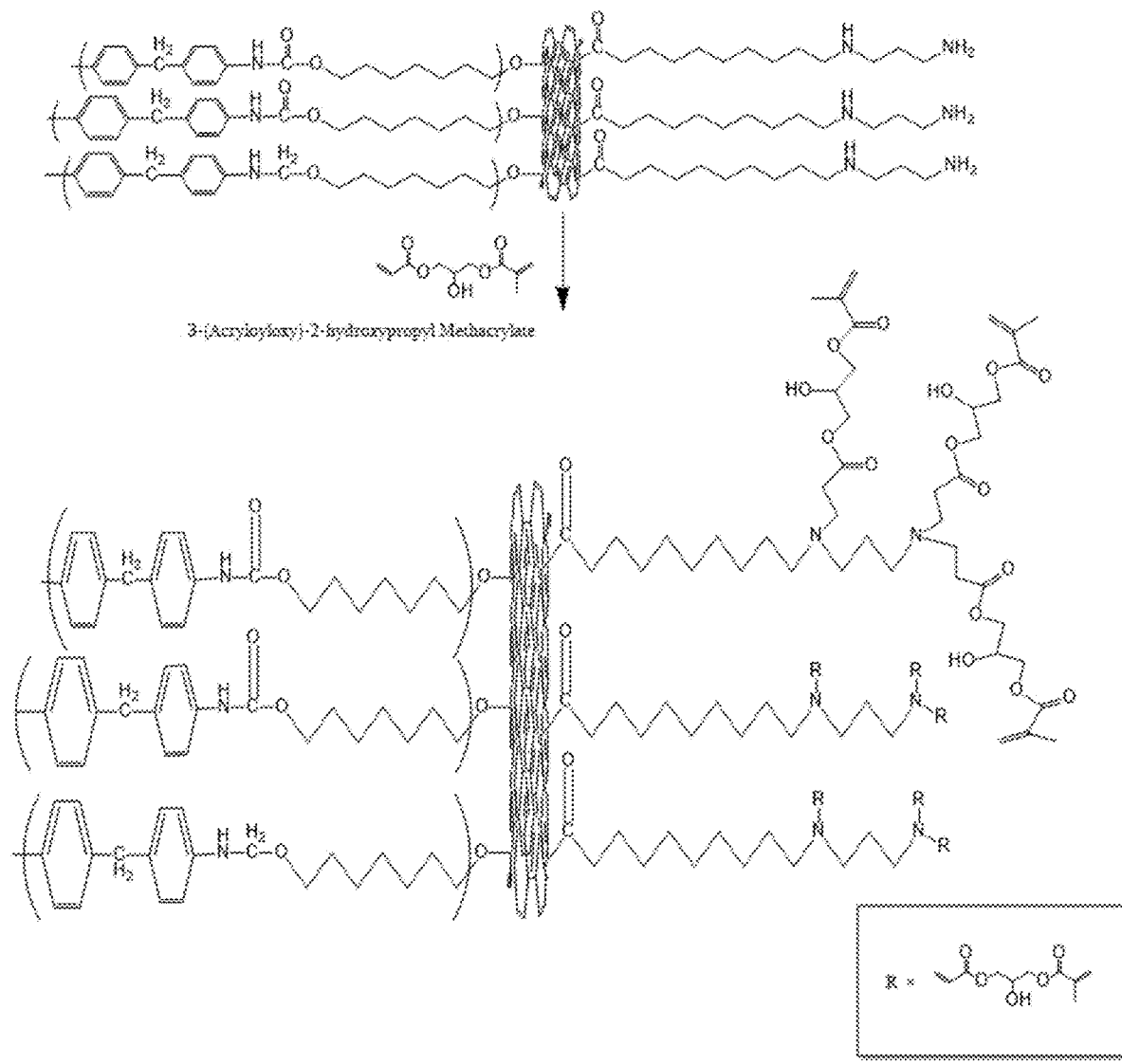
FIG. 21 is an illustration of Reaction Scheme 8.
Figure 22:
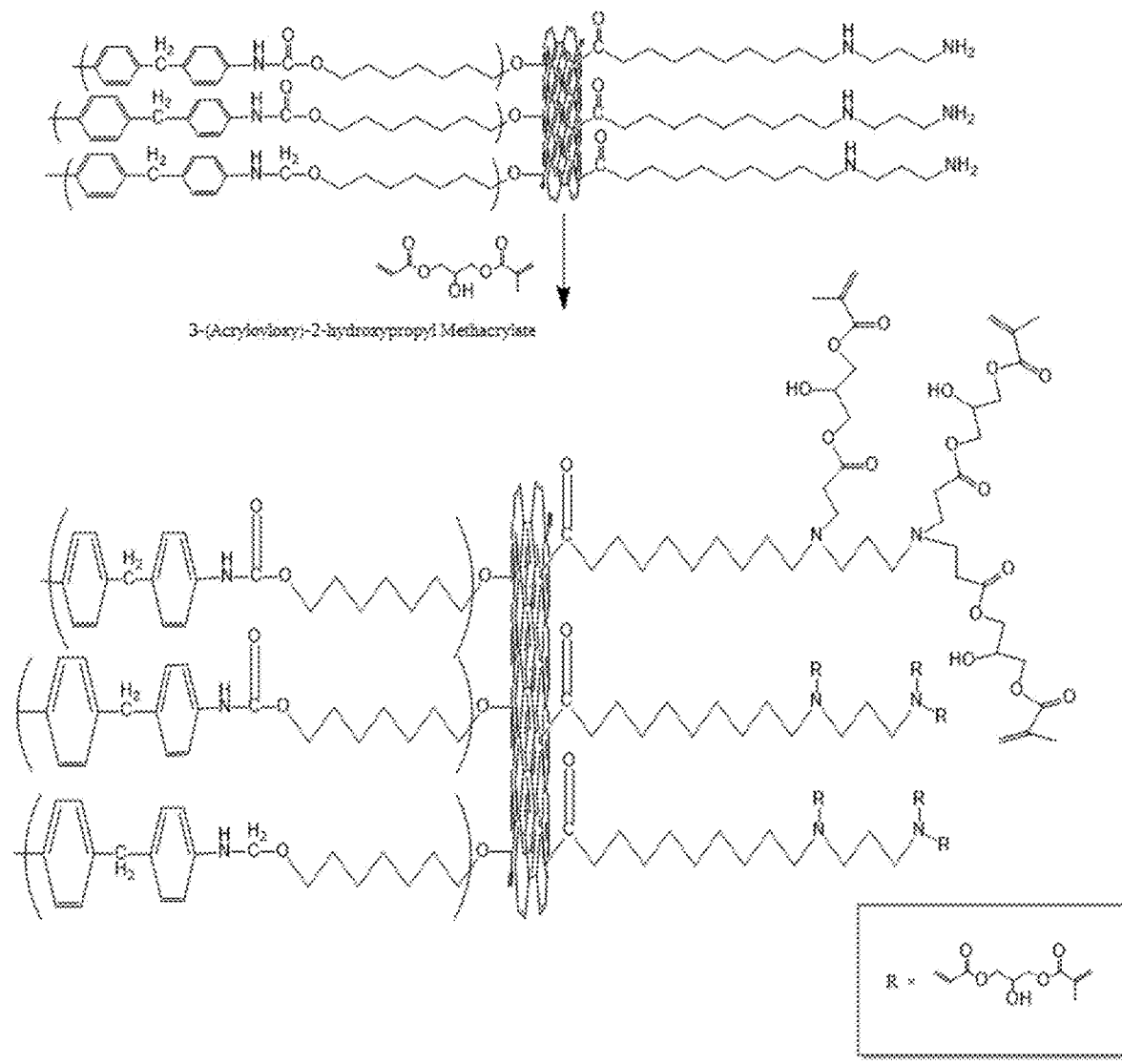
FIG. 22 is an illustration of Reaction Scheme 9.

12 g of the MWCNT-PMMA compound to which an amine group (—NH$_2$) was introduced and 19 g of the prepared TPU oligomer compound were added to 50 ml of a DMF solvent, and reacted at 80° C. for 8 hours to prepare TPU-CNT-PMMA. After the reaction was completed, the resulting product was filtered and dried at 110° C. for 48 hours, thereby obtaining a final compound.
Step 5: Modification of TPU-CNT-PMMA
[Reaction Scheme 8] of FIG. 21
TPU-CNT-PMMA was prepared according to the procedure of Reaction Scheme 8.

Figure 4:
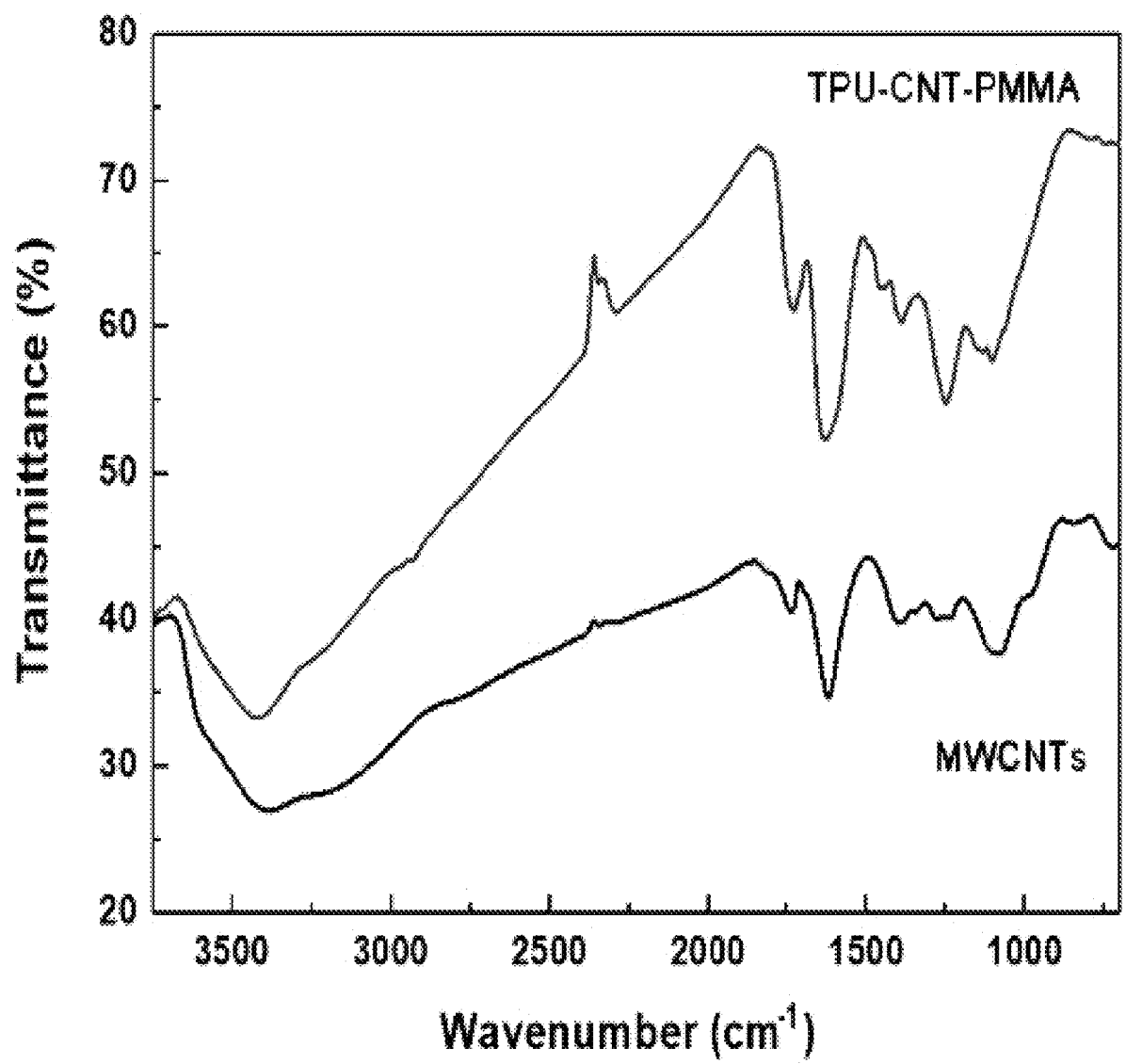
FIG. 4 is an FT-IR spectroscopic analysis graph of TPU-CNT-PMMA according to Preparation Example of the present application.

In order to introduce a large amount of acrylate groups used as a polymer binder to the TPU-CNT-PMMA compound, modification was performed using 3-(acryloyloxy)-2-hydroxypropyl methacrylate (AHM, M.W.=214.22, Aldrich) used to improve modification for uniform dispersibility and chemical or physical surface stability. Since AHM has one methacrylate group enabling a Michael addition reaction on one side and one methacrylate group with no Michael addition reactivity on the other side, it is possible to introduce the polymerization-reactive methacrylate groups through the Michael addition reaction. To prepare this, 23 g of TPU-CNT-PMMA was added to a flask containing ethanol and distilled water in a 95:5 volume ratio, stirred at 300 rpm for approximately 2 hours or more, followed by completing further stirring for approximately 3 hours by inputting approximately 2 M AHM. When the reaction was completed, the resulting product was purified by reduced pressure filtration and then dried in a vacuum oven at approximately 50° C. for 24 hours, thereby obtaining a finally modified product.
[Reaction Scheme 9] of FIG. 21
The final reaction of the modified TPU-CNT-PMMA product prepared according to the procedure of Reaction Scheme 8 was completed with MMA and 2,2-azobisisobutyromitrile (AIBN) as an initiator according to Reaction Scheme 9. The final TPU-CNT-PMMA prepared by the procedure may be a modified carbon nanotube (MWCNT), which is represented by Formula 6. In Formula 6, n is 123 and m is 204. The FT-IR spectroscopy graph of TPU-CNT-PMMA according to the Preparation Example of the present application is shown in FIG. 4. In FIG. 4, the IR spectra for MWCNTs-COOH showed two absorption bands at 1740 cm$^{-1}$ (corresponding to the stretching vibration of a carbonyl group C=O) and 1635 cm$^{-1}$ (corresponding to the conjugated C=C stretching). MWCNTs-g-PMMA showed a typical absorption band at 2100 cm$^{-1}$ (—N$_3$ group). After the reaction, new absorption peaks were shown at 1110 cm$^{-1}$ and 1020 cm$^{-1}$, indicating the C—O—C group of an ester group of PMMA grafted on the MWCNT surface.

<Preparation Example 2> Preparation of Modified Graphene Oxide (GO)

Among several methods of preparing graphene, the present application uses a method in which graphene fragments of a monoatomic layer are detached from a graphite crystal using oxidation, reduction and a surfactant and dispersed in a solution. Compared to other methods, since this method has advantages of a high yield and easy chemical functionalization, a graphene-added composite suitable for antistatic coating may be prepared by introducing a large amount of methacrylate groups enabling free radical polymerization and then introducing a large amount of urethane groups enabling condensation polymerization to a surface.
Step 1: Preparation of Graphite Oxide (GO)

To prepare the graphene oxide (GO) used in the present application, a graphite product (graphite powder) (Grade: SP-1, Bay Carbon Co. Ltd.) and cold sulfuric acid (H$_2$SO$_4$) (97.0%, SAMCHUN Chemical Co., Ltd.) were added to a reactor in a ratio of approximately 1:25, and stirred while potassium permanganate (KMnO$_4$) (99.3%, Samchun Chemical Co., Ltd., potassium permanganate) was slowly added in a proportion approximately three times the graphite, and a surrounding environment was created with an ice bath so that the temperature did not exceed 20° C. After potassium permanganate (KMnO$_4$) was completely added, the resulting mixture was stirred in an oil bath at 35° C. for 2 to 3 hours, distilled water was further added in a ratio of 1:5 with respect to the cold sulfuric acid that was added previously, and then stirred again for approximately 30 minutes. After all of the reactions were completed, distilled water added in a ratio of approximately 1:3 with respect to the sulfuric acid and a hydrogen peroxide solution added in a ratio of 1:5 with respect to the graphite were mixed and reacted sufficiently for more than 30 minutes, thereby obtaining a graphite oxide dispersion prepared first, and acidic impurities were eliminated by centrifuging the resulting dispersion using a centrifuge at approximately 4,000 rpm, and remaining metal ions were completely removed using a solution in which distilled water and hydrochloric acid were mixed in a ratio of 9:1, washed several times with distilled water, adjusted to a pH value of approximately 7, and lyophilized at −40° C. for 48 hours, thereby preparing a final graphene oxide.

Figure 5:
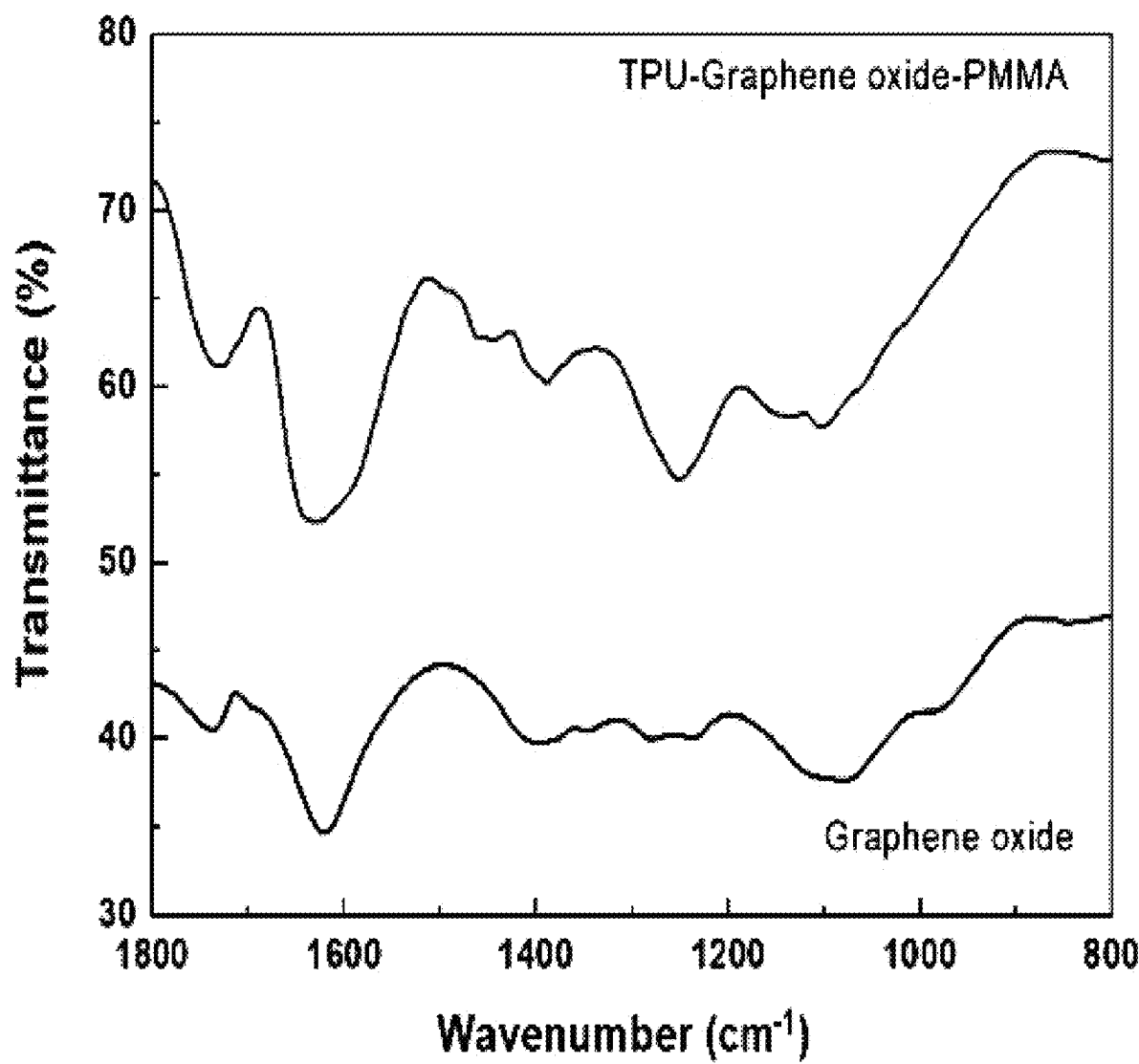
FIG. 5 is an FT-IR spectroscopic analysis graph of TPU-GO-PMMA according to Preparation Example of the present application.
Figure 6:
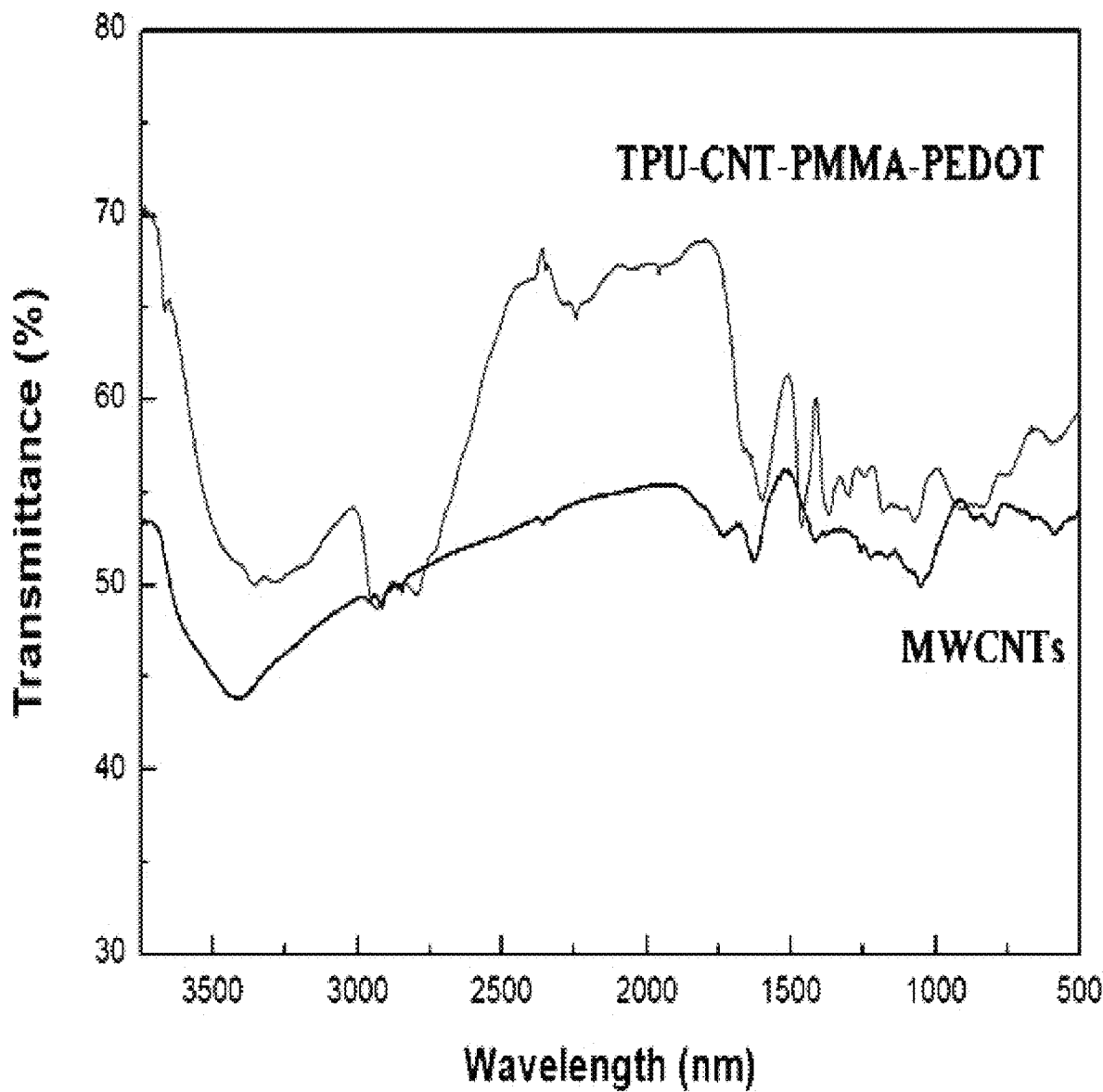
FIG. 6 is an FT-IR spectroscopic graph of a carbon nanotube conductive structure according to Preparation Example of the present application.

Afterward, TPU-graphene oxide-PMMA of Formula 7 below was prepared using the same method as described in Preparation Example 1. The FT-IR spectroscopy graph of the TPU-GO-PMMA according to Preparation Example of the present application is shown in FIG. 5. In FIG. 5, the absorption peaks of C═O carbonyl stretching, O—H deformation vibration and C—OH stretching are shown at 1733 cm$^{-1}$, 1412 cm$^{-1}$ and 1226 cm$^{-1}$, respectively, and after the reaction, new absorption peaks are shown at 1110 cm$^{-1}$ and 1020 cm$^{-1}$, indicating the C—O—C group of an ester group of PMMA grafted on the surface of the graphene oxide. FIG. 6 shows the dispersion patterns of MWCNT and GO before and after modification. In FIG. 6(a) shows the dispersion of MWCNT before modification, FIG. 6(b) shows the dispersion of MWCNT after modification, FIG. 6(c) shows the dispersion of GO before modification, and FIG. 6(d) shows the dispersion of GO after modification.

Figure 10:
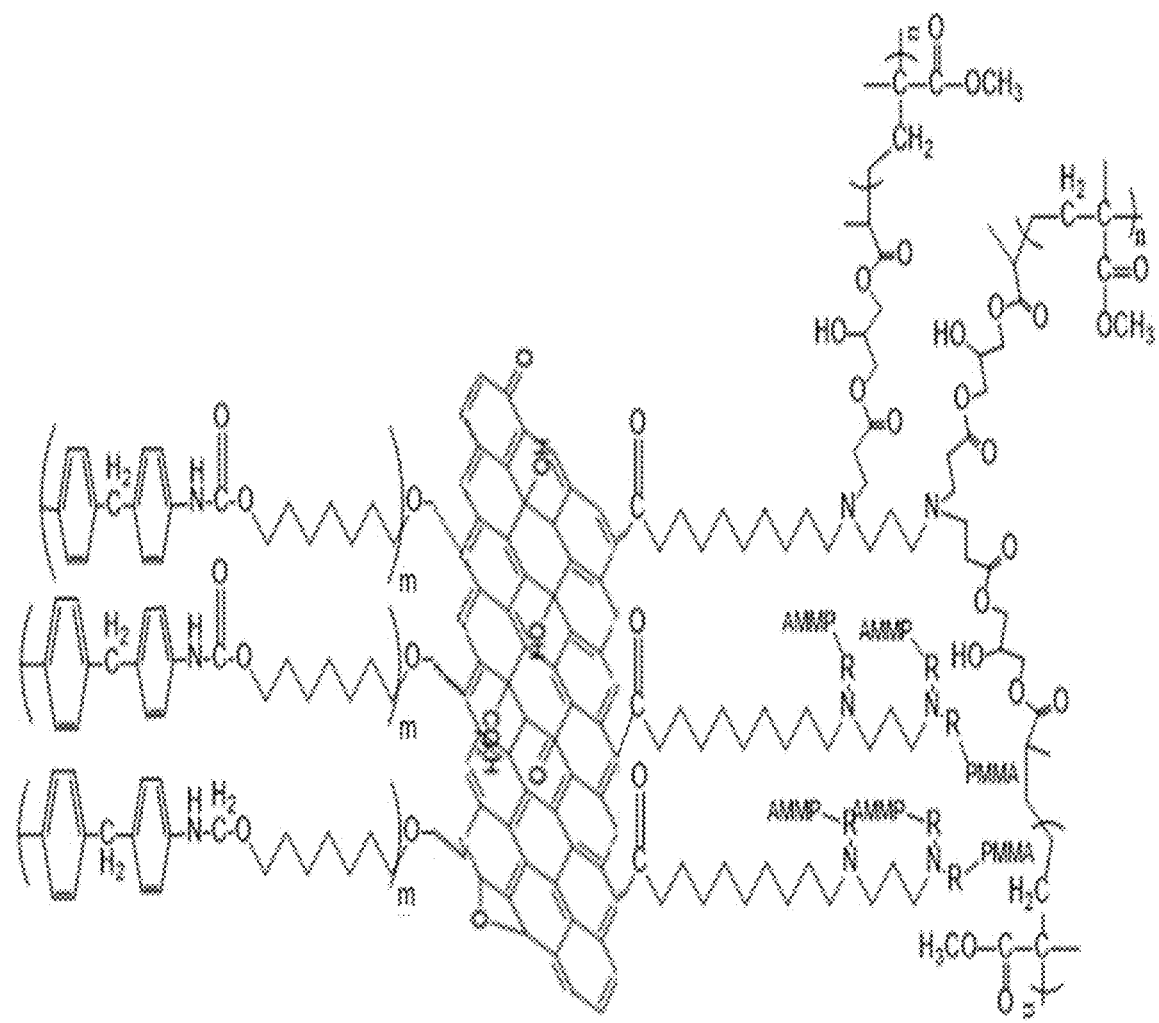
FIG. 10 is a chemical structure of Formula 7.

[Formula 7] of FIG. 10

<Preparation Example 3> Preparation of Conductive Structure Using Modified Carbon Nanotube and PEDOT PSS Step 1: Preparation of Modified PEDOT

[Reaction Scheme 10]

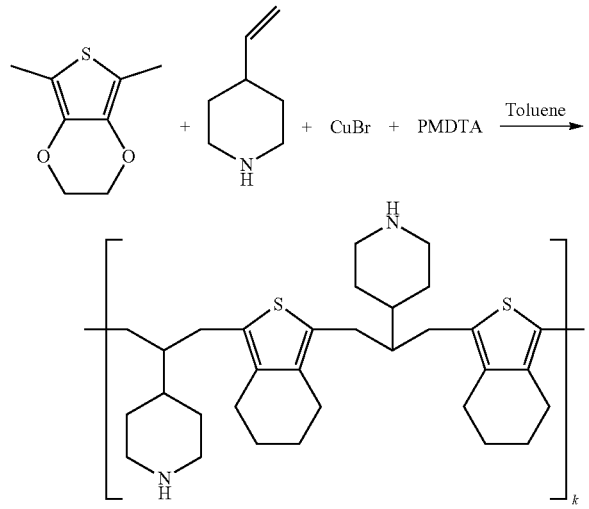

The modified PEDOT was prepared according to the process of Reaction Scheme 10.

The modified PEDOT was prepared using EDOT (Sigma-Aldrich), 4-vinylpiperidine (Sigma-Aldrich), CuBr (Sigma-Aldrich), and azobisisobutyronitrile (AIBN; Sigma-Aldrich) as a radical polymerization initiator, N,N,N',N'',N''-pentamethyldiethylenetriamine (PMDTA; Sigma-Aldrich), and toluene (Sigma-Aldrich) as a solvent.

The process of preparing the modified PEDOT using EDOT and 4-vinylpiperidine was as follows.

A 4-neck flask was purged with nitrogen to create a nitrogen atmosphere inside the flask, EDOT (4 mmol) (0.568 g), 4-vinylpiperidine (4 mmol) (0.84 g), CuBr (0.16 mmol) (0.02 g), AIBN (0.05 mmol) (0.008 g) as radical initiators and PMDTA (0.32 mmol) (0.05 g) were put into the flask, and 50 ml of toluene was put into the flask, followed by stirring at room temperature for 30 minutes. After stirring for 30 minutes, the temperature condition was set to 90° C., and then stirring was performed for 24 hours.

After stirring for 24 hours, the temperature was cooled to room temperature (25° C.), the modified PEDOT polymer was precipitated three times or more using 800 mL of methanol (Sigma-Aldrich), and then dried under high vacuum, thereby obtaining a conductive structure of Formula 8. The repeat unit K is 300.

Step 2: Preparation of Conductive Structure Using Modified Carbon Nanotube and PEDOT PSS The modified carbon nanotube of Formula 6 and PSS were put into a reactor in a weight ratio of 1:20, water was added to the reactor, and dispersion work was performed for 50 minutes using an ultrasonic disperser. Although the carbon nanomaterial itself is not easily dispersed in water, it may be effectively dispersed by using PSS, which is used as a raw material for synthesizing a conductive polymer.

After 50 minutes, PEDOT was added to have an EDOT-to-PSS ratio of 1:3, the reactor was purged with nitrogen to block oxygen, and then the reactants were stirred to be dispersed for 5 hours, thereby preparing a conductive structure of Formula 8 below, in which PEDOT and PSS were connected to the modified carbon nanotube. In the following formula, n is 123, m is 204, and k is 300.

FIG. 6 is the FT-IR spectroscopic graph of a carbon nanotube conductive structure according to the preparation example of the present application. In FIG. 6, the C—O—C group of an ester group of PMMA grafted to the MWCNT surface was also confirmed from the final product.

Figure 11:
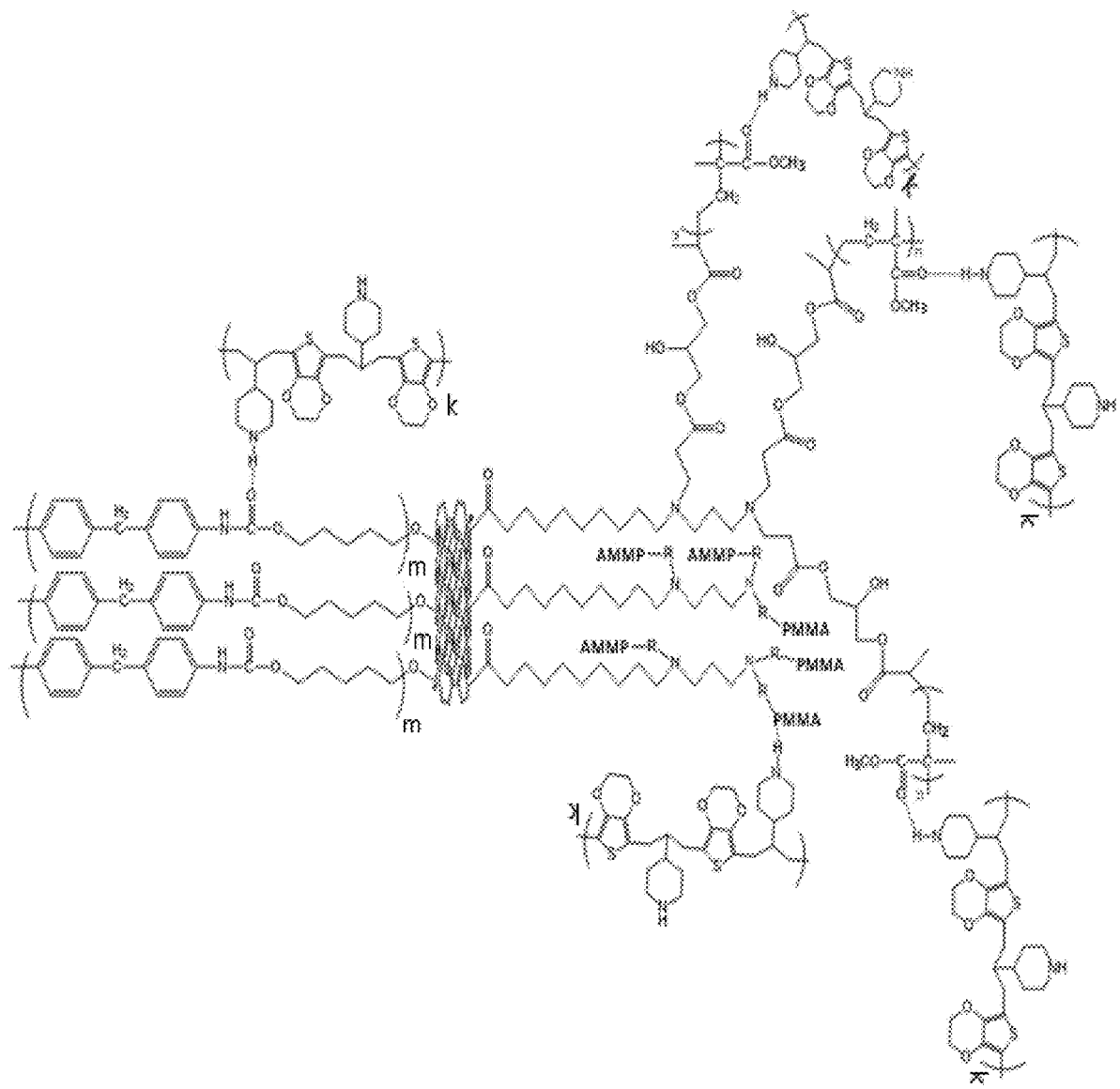
FIG. 11 is a chemical structure of Formula 8.
Figure 12:
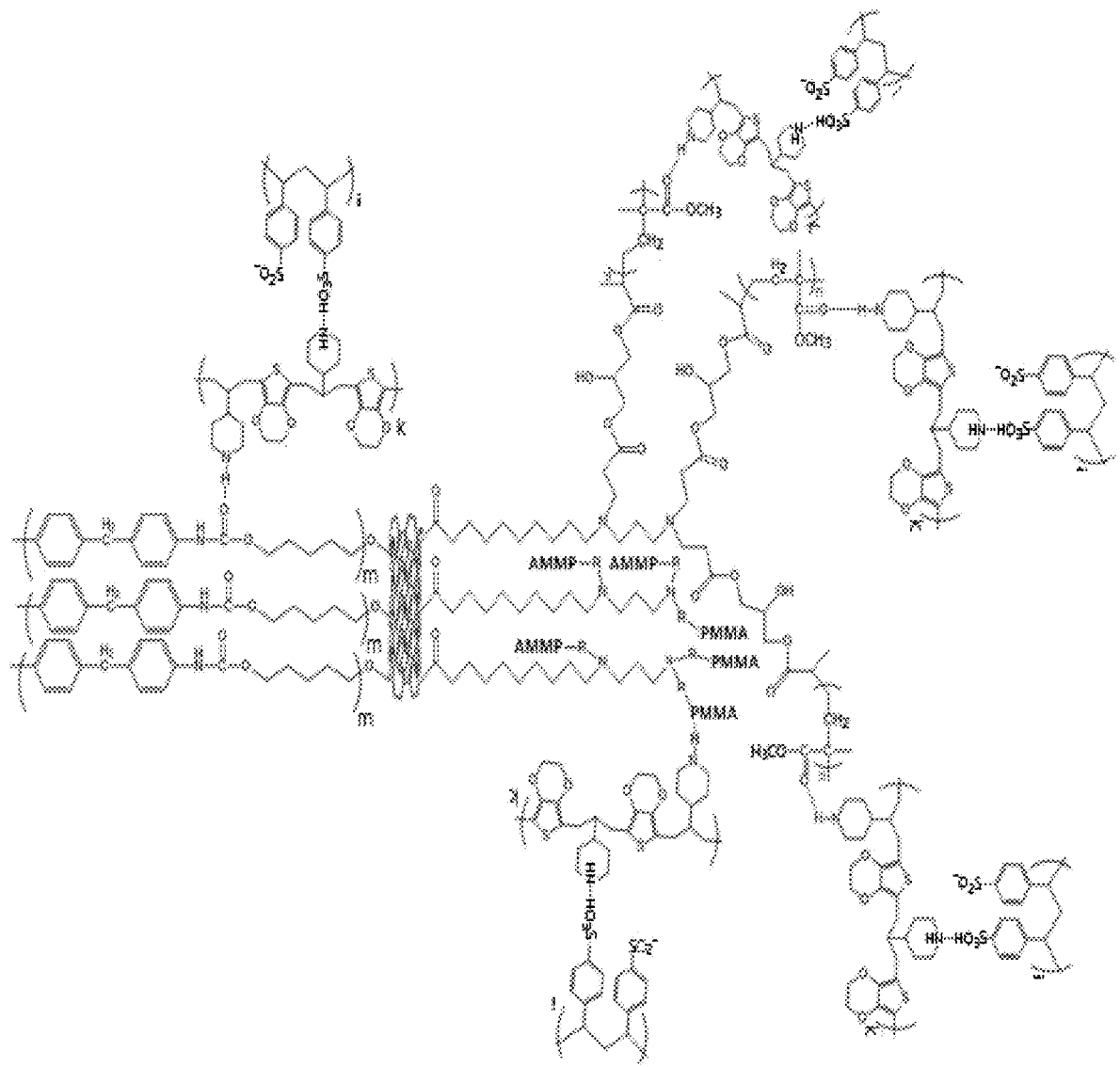
FIG. 12 is a chemical structure of Formula 9.
Figure 13:
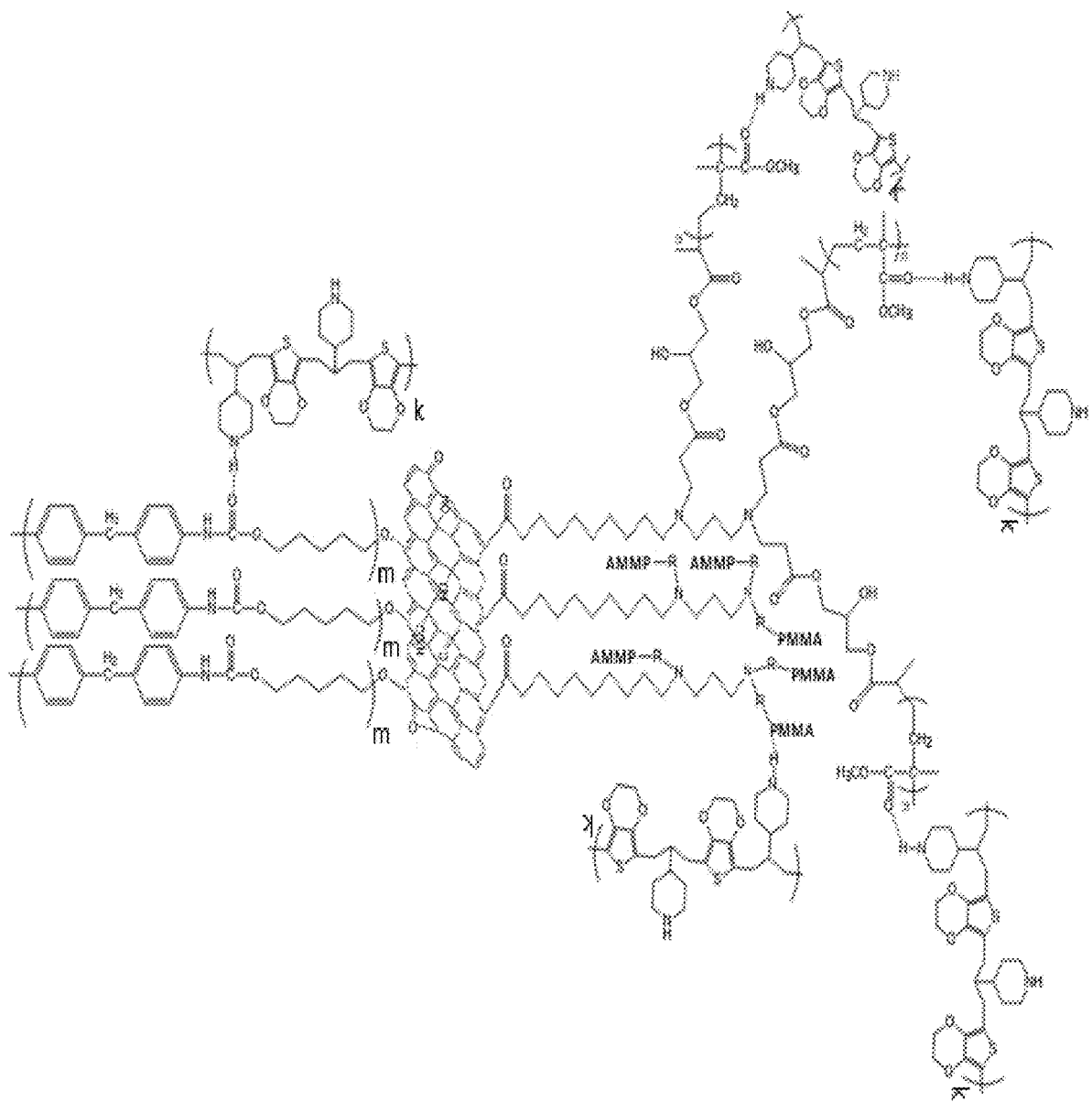
FIG. 13 is a chemical structure of Formula 10.

[Formula 8] of FIG. 11

<Preparation Example 4> Preparation of Conductive Structure Using Modified GO and PEDOT PSS A conductive structure of Formula 11 was prepared in the same manner as described in Preparation Example 3, except that the modified GO of Formula 7 was used instead of the modified carbon nanotube of Formula 6.

Figure 7:
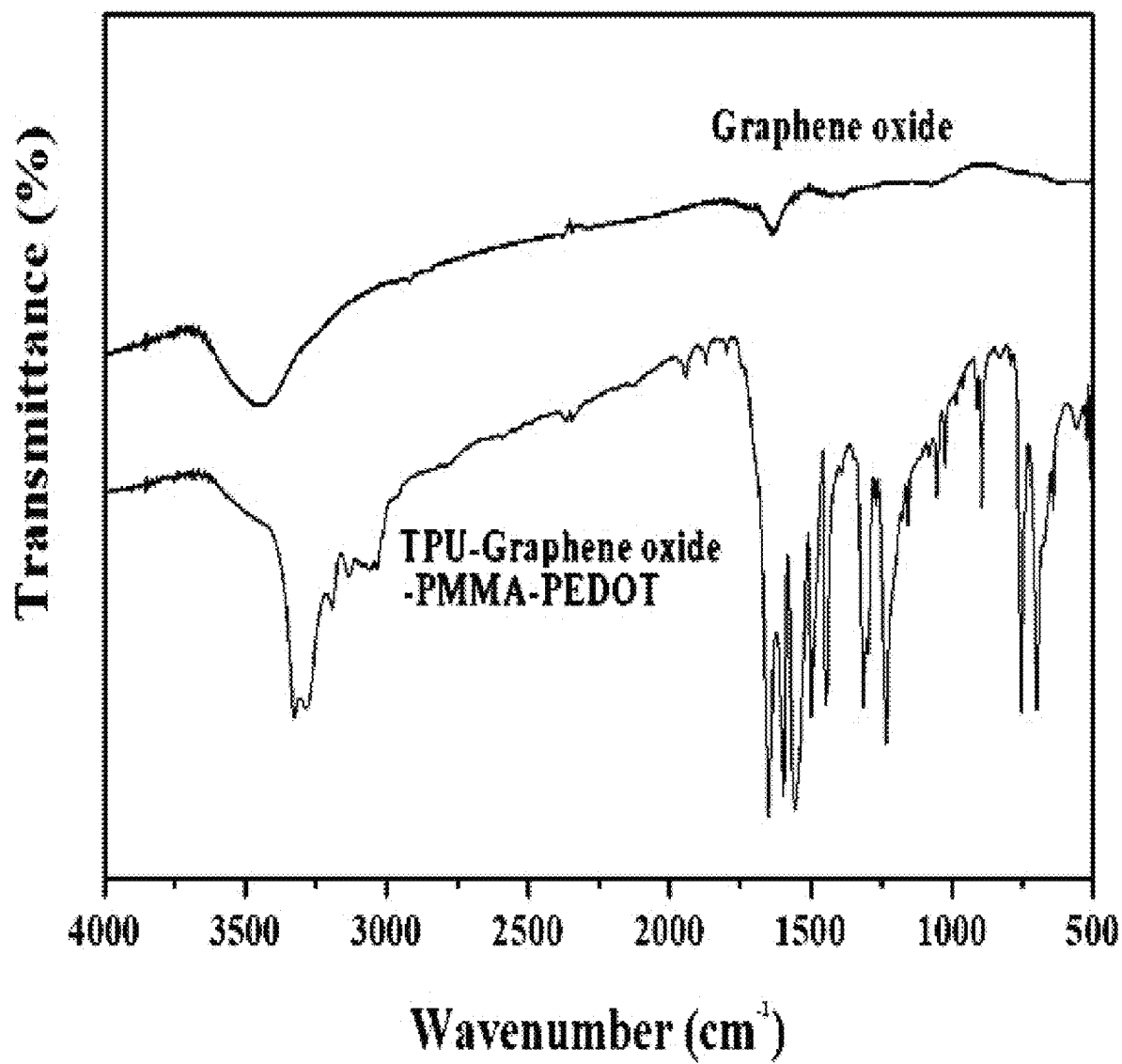
FIG. 7 is an FT-IR spectroscopic graph of a GO conductive structure according to an example of the present application.

FIG. 7 is the FT-IR spectroscopic graph of a GO conductive structure according to an example of the present application. A new stretch peak is shown at 1646 cm$^{-1}$, and considered as amide carbonyl-stretching. A peak shown at 1543 cm$^{-1}$ indicates an amide or carbamate ester, and CH—N deformation vibration as well as C—N stretching vibration.

Figure 14:
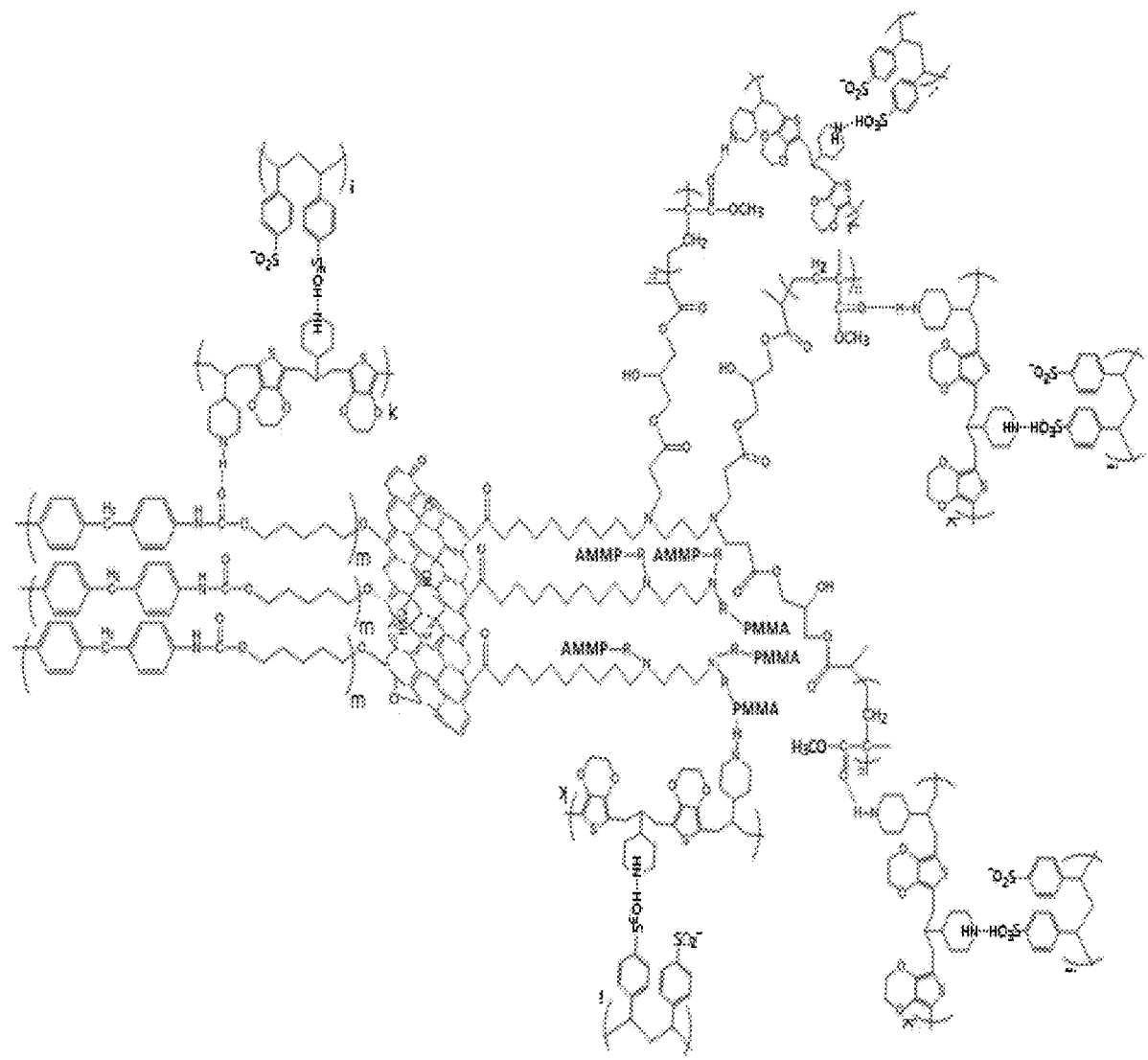
FIG. 14 is a chemical structure of Formula 11.

[Formula 11] of FIG. 14

Example 1. Preparation of Antistatic Composition

An antistatic composition was prepared by adding 70 ml of water to 30 g of the conductive structure of the carbon nanotube of Preparation Example 3.

Example 2. Preparation of Antistatic Composition

An antistatic composition was prepared by adding 70 mL of water to 30 g of the conductive structure of the GO of Preparation Example 4.

Comparative Example 1 Preparation of Antistatic Composition 7 wt % (35 g) of multi-well carbon nanotubes (Nanocyl, Belgium), 3 wt % (15 g) of a TPU binder (Sigma-Aldrich), 30 wt % (150 ml) of PEDOT (Sigma-Aldrich):PSS (Sigma-Aldrich), 55 wt % of a solvent (15 wt % (75 ml) of water, 10 wt % (50 ml) of ethanol (Alfa Aesar)), 10 wt % (50 ml) of isopropyl alcohol (Alfa Aesar), 20 wt % (100 ml) of DMSO (Alfa Aesar)), 15 wt % (75 ml) of N,N-dimethyl-ethanolamine (DMEA) (Alfa Aesar) as a pH adjuster, and 15 wt % (75 ml) of 2,5,8,11-tetramethyl-6-dodecyn-5,8-diol-ethoxylate (Alfa Aesar) as a surfactant were mixed, thereby preparing an antistatic composition.

EXPERIMENTAL EXAMPLES

The pencil hardness, surface roughness, surface resistance, adhesive property and wear resistance of a coating layer, which was formed by coating a specimen with each of the antistatic compositions of Example 1, Example 2 and Comparative Example 1, were measured.

<Experimental Example 1> Pencil Hardness

A pencil hardness was measured using a pencil hardness tester (Heidon) in accordance with KS G2603. 6B to 9H pencils (Mitsubishi) were used, and the test was conducted five times with a pencil load of 1 kg on the coating layer, a pencil scratching angle of 45°, and a pencil scratching speed of 60 mm/min. When one or more scratches occurred, the test was conducted using a pencil with a hardness lower than that of the pencil used. When there were no scratches in all five evaluations, the corresponding hardness was determined as a pencil hardness.

The result of measuring the pencil hardness of coating layers formed of the antistatic compositions including the modified carbon nanotube and the modified graphene oxide of Examples 1 and 2 of the present application is shown in Table 1 below. The pencil hardness of Example 1 was 3H, and the pencil hardness of Example 2 was 3H. The pencil hardness of the general antistatic coating solution of Comparative Example was 1H. Since the hardness of Examples 1 and 2 is higher than that of Comparative Example, it can be confirmed that Examples exhibited higher mechanical strength than Comparative Example.

<Experimental Example 2> Surface Roughness

A value of surface roughness (Ra) was measured using the 3D Optical Profiler NV-2000.

The result of measuring the surface roughness of coating layers formed of the antistatic compositions including the modified carbon nanotube and the modified graphene oxide of Examples 1 and 2 of the present application is shown in Table 1 below. The surface roughness of Example 1 was 0.35 μm, and the surface roughness of Example 2 was 0.28 μm. The surface roughness of Comparative Example relating to a general antistatic coating solution was 1.3 μm. Since the surface roughness of Example 1 was approximately 3.7-fold smaller than that of Comparative Example, and the surface roughness of Example 2 was approximately 4.6-fold smaller than that of Example 2, it can be confirmed that the surface roughness is improved in Examples, compared to Comparative Example.

<Experimental Example 3> Surface Resistance

The surface resistance of a sample with a size of 100×100 mm was measured using the Keithley 6220 current source, the 2182A nano voltameter and the 4-probe method in accordance with ASTM D 257.

The result of measuring the surface resistance of coating layers formed of the antistatic compositions including the modified carbon nanotube and the modified graphene oxide of Examples 1 and 2 of the present application is shown in Table 1 below. After 6 months, the surface resistance of Example 1 increased approximately 4 times based on the initial level of $2\times10^5$ ohm/sq, and the surface resistance of Example 2 increased 2.5 times based on the initial level of $4\times10^4$ ohm/sq. The surface resistance of Comparative Example increased 500 times based on the initial level of $2\times10^7$ ohm/sq. In Examples 1 and 2, the surface resistance effect was maintained even after 6 months, compared to Comparative Example, therefore it can be confirmed that Examples exhibited improved electrical properties compared to Comparative Example.

<Experimental Example 4> Adhesive Property

The adhesive property was evaluated at a temperature of 21 to 25° C., a relative humidity of 45% to 55% for 16 hours or more in accordance with KS M ISO 2409, and the number of cuts was measured 6 times in each direction of the grid shape.

The result of measuring the adhesive property of coating layers formed of the antistatic compositions including the modified carbon nanotube and the modified graphene oxide of Examples 1 and 2 of the present application is shown in Table 1 below. The adhesive property of the composition including the modified carbon nanotube conductive structure of Example 1 was 100%, and the adhesive property of the composition including the modified graphene oxide conductive structure of Example 2 was 100%. The adhesive property of the general antistatic coating solution of Comparative Example was 100%. It can be confirmed that Examples 1 and 2 exhibited an excellent adhesive property like Comparative Example.

<Experimental Example 5> Wear Resistance

A wear resistance was measured in accordance with ASTM D-4060-19.

The result of measuring the wear resistance of coating layers formed of the antistatic compositions including the modified carbon nanotube and the modified graphene oxide of Examples 1 and 2 of the present application is shown in Table 1 below. The wear resistance of the composition including the modified carbon nanotube of Example 1 was 1.62%, and the wear resistance of the composition including the modified graphene oxide of Example 2 was 0.97%. The wear resistance of Comparative Example relating to a general antistatic coating solution was 7.31%. Since the wear resistance of Example 1 is approximately 4.5-fold smaller than that of Comparative Example, and the wear resistance of Example 2 is approximately 7.5-fold smaller than that of Comparative Example, it can be confirmed that Examples have excellent mechanical strength compared to Comparative Example.

<Experimental Example 6> Visual Observation of Coating Layers

Figure 8A:
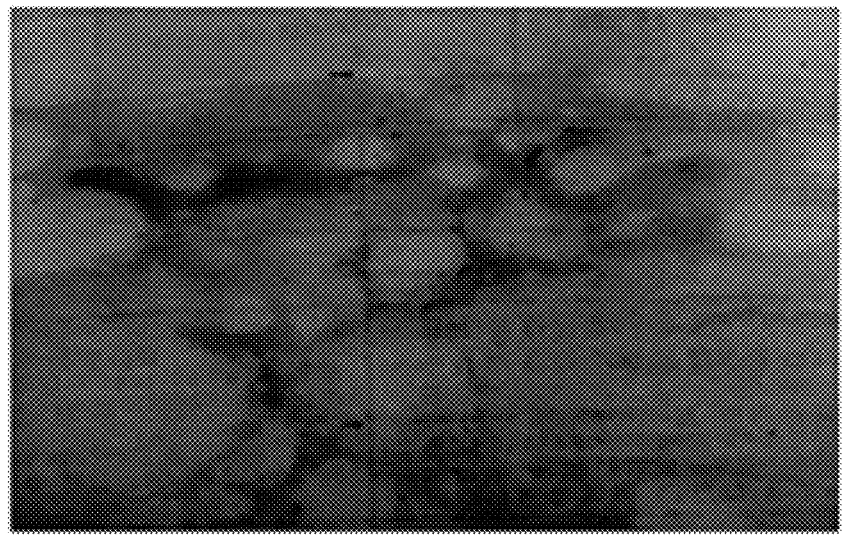
FIG. 8*a* is a state observed by the naked eye when coating is performed by mixing unmodified MWCNTs and PEDOT.
Figure 8B:
FIG. 8*b* is a state observed with the naked eye when coating is performed using a composition having a conductive structure of MWCNTs.
Figure 8C:
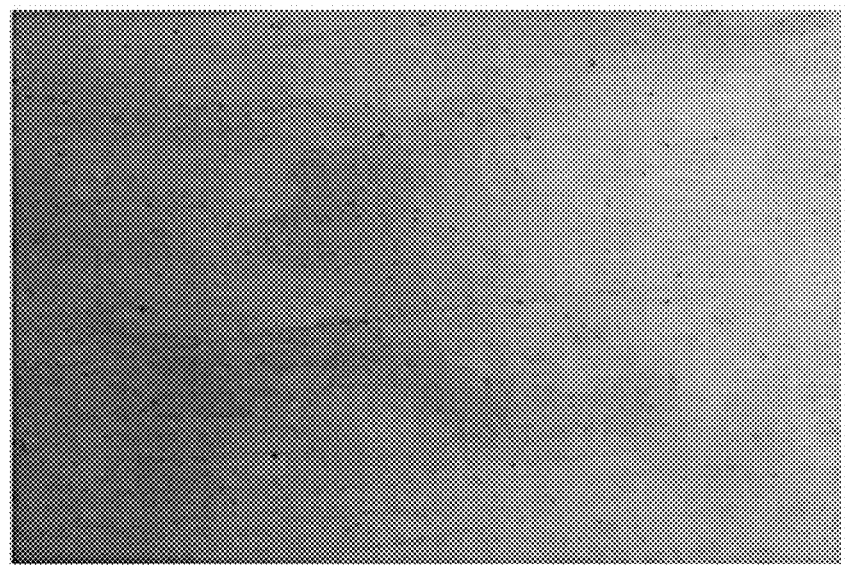
FIG. 8*c* is a state observed by the naked eye when coating is performed using a composition having a GO conductive structure.
Figure 9:
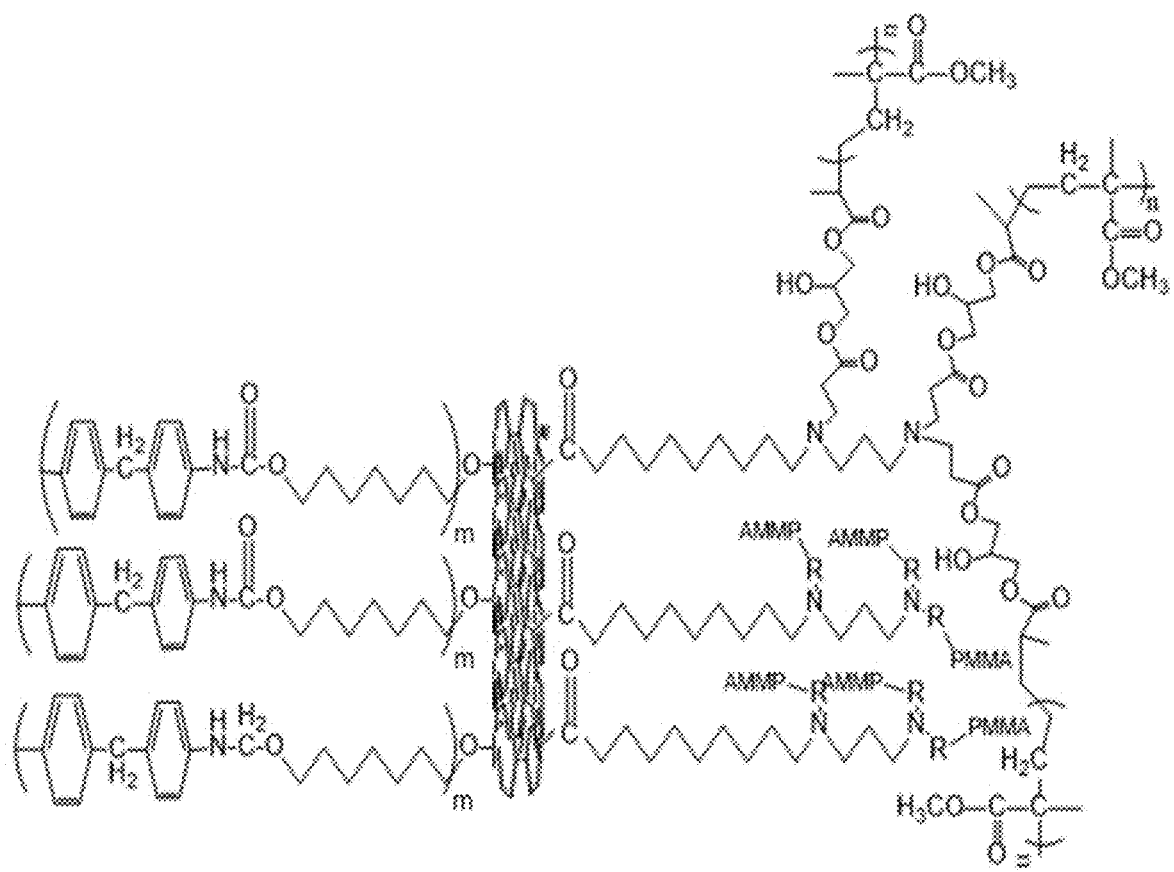
FIG. 9 is a chemical structure of Formula 6.

FIG. 8 shows coating layers observed with the naked eye. FIG. 8(a) is a state observed with the naked eye when coating is performed with a mixture of unmodified MWCNT and PEDOT, FIG. 8(b) is a state observed with the naked eye when coating is performed with a composition using an MWCNT conductive structure, and FIG. 8(c) is a state observed with the naked eye when coating is performed with a composition using a GO conductive structure. When PEDOT:PSS was coated with unmodified CNTs and graphene, it was confirmed that particles were not well dispersed and a large amount of the particles were observed with the naked eye. When the CNT and graphene were not modified, the cohesive strength of the C—C bond increased so the particles were aggregated.

TABLE 1

| Evaluation items | | Units | Example 1 | Example 2 | Comparative Example 1 |
|---|---|---|---|---|---|
| Pencil hardness | | H | 3H | 3H | 1H |
| Surface roughness | | μm | 0.35 | 0.28 | 1.3 |
| Surface resistance | Initial | ohm/sq | $2 \times 10^5$ | $4 \times 10^4$ | $2 \times 10^7$ |
| | After 6 months | ohm/sq | $8 \times 10^5$ | $1 \times 10^5$ | $1 \times 10^{10}$ |
| Adhesive property | | % | 100 | 100 | 100 |
| Wear resistance | | % | 1.62 | 0.97 | 7.31 |

Collectively, it can be confirmed that, compared to when the antistatic coating solution of Comparative Example is used, when the antistatic composition using a conductive structure of the present application is used, a hardness increases, a surface roughness is improved, the electrical property of surface resistance is improved, a wear resistance is improved, and an excellent adhesive property is exhibited.

The present application compensates for the disadvantage of an antistatic coating solution which was conventionally used, and ensures surface resistance, surface roughness and wear resistance, so it may be used in various applications such as trays, transfer carts and packaging materials for electronic devices including batteries and semiconductors As described above, in the drawings and specification, optimal embodiments are disclosed. Here, specific terms are used, but this is only used for the purpose of describing the present application and is not used to limit the meaning or the scope of the present application described in the claims. Therefore, it should be understood by those of ordinary skill in the art that various modifications and equivalents can be made from the embodiments of the present application. Thus, the true technical scope should be determined by the technical spirit of the appended claims.

What is claimed is:

1. A conductive structure formed by connecting a modified carbon nanotube with a conductive polymer,
wherein the modified carbon nanotube has one or more oligomers selected from an acrylic oligomer and a urethane oligomer binding to the surface of the carbon nanotube through a branch linkage, and
the conductive polymer is connected to the oligomer,
wherein the conductive polymer is poly(3,4-ethylendioxythiopene) (PEDOT); or poly(3,4-ethylenedioxythiopene) (PEDOT) and polystyrene sulfonic acid (PSS); and
wherein the PEDOT has one or more functional groups comprising an NH group.

2. The conductive structure of claim 1, wherein the PEDOT is represented by Formula 3 below,

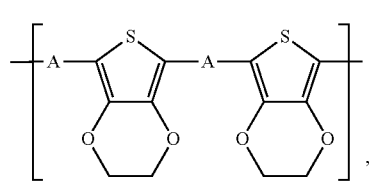

[Formula 3]

wherein A is

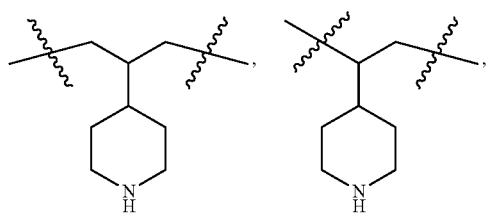

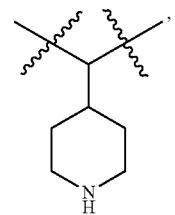

or —NH.

3. The conductive structure of claim 1, wherein the acrylic oligomer and the urethane oligomer comprise one or more of n number of first units with an acrylic group and m number of second units with a urethane group, wherein each of n and m is an integer of 0 to 1000, and n+m is an integer of 1 to 1000.

4. The conductive structure of claim 3, wherein the first unit is represented by Formula 4, and the second unit is represented by Formula 5,

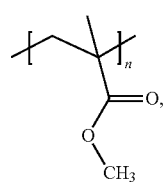

[Formula 4]

wherein n is an integer of 0 to 1000,
[Formula 5]
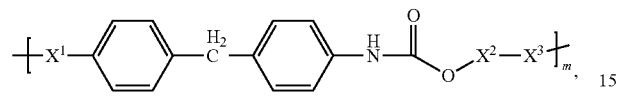
wherein $X^1$ is a direct linkage, or a urethane group or a $C_1$-$C_{10}$ alkylene group,
$X^2$ is a $C_1$-$C_{10}$ alkylene group,
$X^3$ is a direct linkage, O or S, and
m is an integer of 0 to 1000.
5. The conductive structure of claim 1, wherein the modified carbon nanotube is represented by Formula 6 below,
[Formula 6]
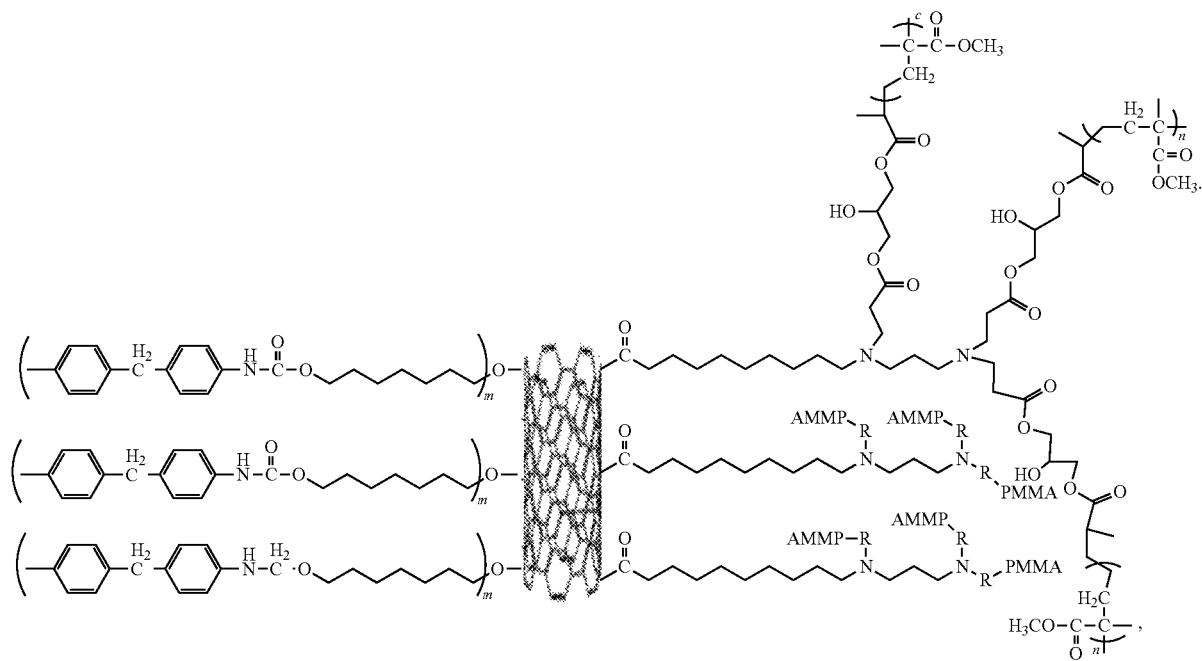

wherein, in Formula 6,
R is

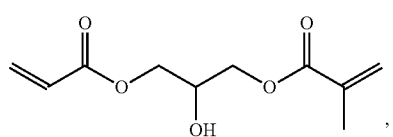

and each of n and m is independently an integer of 0 to 1000.

6. The conductive structure of claim 1, wherein the modified carbon nanotube has one or more functional groups selected from a hydroxyl group (—OH), a formyl group (—CHO), a carbonyl group (—CO), an amine group (—NH$_2$) and a carboxyl group (—COOH) on its surface.

7. The conductive structure of claim 1, wherein the carbon nanotube:the acrylic oligomer and the urethane oligomer:the conductive polymer are connected in a weight ratio of 2:1:8 to 1:0.2:100.

8. The conductive structure of claim 1, wherein the conductive structure is represented by Formulas 8 below:

[Formula 6]
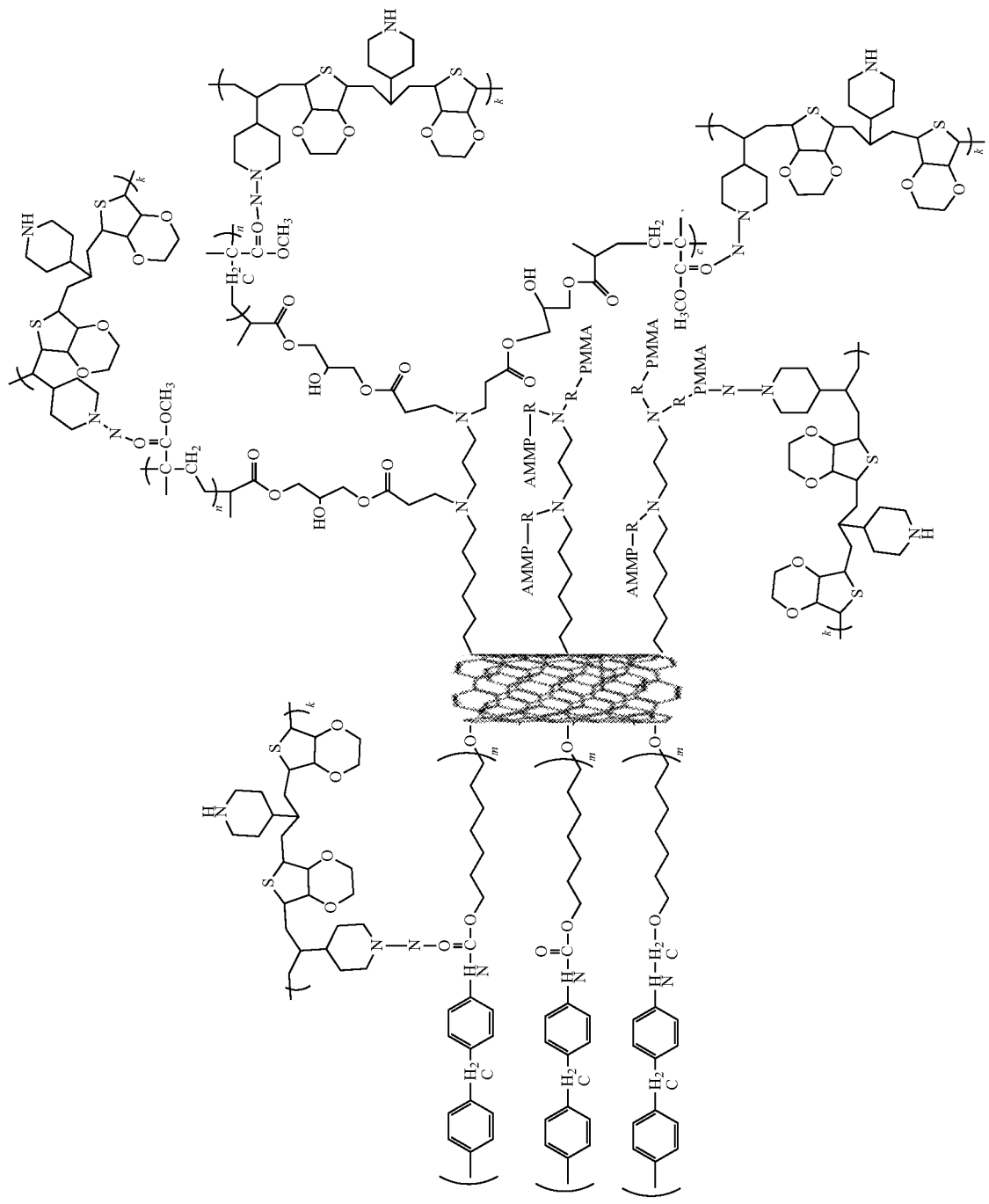

wherein, in Formula 8,
R is
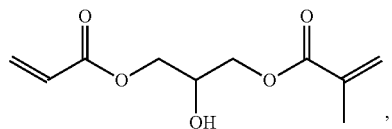
each of n and m is independently an integer of 0 to 1000, and
k is an integer of 1 to 10,000,000.
* * * * *